(12) United States Patent  (10) Patent No.: US 7,545,365 B2
Kent et al.  (45) Date of Patent: Jun. 9, 2009

(54) ACOUSTIC TOUCH SENSOR

(75) Inventors: Joel C. Kent, Fremont, CA (US); Paulo I. Gomes, Redwood City, CA (US)

(73) Assignee: Tyco Electronics Corporation, Middletown, PA (US)

( * ) Notice: Subject to any disclaimer, the term of this patent is extended or adjusted under 35 U.S.C. 154(b) by 509 days.

(21) Appl. No.: 11/106,166

(22) Filed: Apr. 13, 2005

(65) Prior Publication Data

US 2005/0248547 A1    Nov. 10, 2005

Related U.S. Application Data

(60) Provisional application No. 60/562,455, filed on Apr. 14, 2004, provisional application No. 60/562,461, filed on Apr. 14, 2004.

(51) Int. Cl.
 *G09G 5/00* (2006.01)
(52) U.S. Cl. ...................................... 345/173
(58) Field of Classification Search ........................ None
 See application file for complete search history.

(56) References Cited

U.S. PATENT DOCUMENTS

| | | | |
|---|---|---|---|
| 3,673,327 A | 6/1972 | Johnson et al. | 178/18.04 |
| 3,974,464 A | 8/1976 | Wagers et al. | 333/145 |
| 4,492,949 A | 1/1985 | Peterson et al. | |
| 4,564,928 A | 1/1986 | Glenn et al. | |
| 4,634,917 A | 1/1987 | Dvorsky et al. | |
| 4,642,423 A | 2/1987 | Adler | 345/177 |
| 4,644,100 A | 2/1987 | Brenner et al. | 178/18.04 |
| 4,645,870 A | 2/1987 | Adler | 345/177 |
| 4,700,176 A | 10/1987 | Adler | 341/20 |
| 4,746,914 A | 5/1988 | Adler | 345/177 |
| 4,791,416 A | 12/1988 | Adler | 345/177 |
| 4,825,212 A | 4/1989 | Adler et al. | 345/177 |
| 4,849,996 A | 7/1989 | Kamerman | 375/371 |
| 4,880,665 A | 11/1989 | Adler et al. | 427/126.3 |
| RE33,151 E | 1/1990 | Adler | 345/177 |
| 5,072,427 A | 12/1991 | Knowles | 367/118 |
| 5,162,618 A | 11/1992 | Knowles | 178/18.04 |
| 5,177,327 A | 1/1993 | Knowles | 178/18 |
| 5,243,148 A | 9/1993 | Knowles | 178/18.04 |
| 5,260,521 A | 11/1993 | Knowles | 178/18.04 |
| 5,329,070 A | 7/1994 | Knowles | 178/18.04 |

(Continued)

FOREIGN PATENT DOCUMENTS

EP    1 260 937 A2    11/2002

(Continued)

OTHER PUBLICATIONS

B.A. Auld, *Acoustic Fields and Waves in Solids*, vol. II, 2nd ed., Krieger Publishing Company, 1990, pp. 163-169.

(Continued)

*Primary Examiner*—Richard Hjerpe
*Assistant Examiner*—Tammy Pham

(57) ABSTRACT

A touch sensor comprises a substrate capable of propagating acoustic waves. The substrate includes a first surface having a touch sensitive region and a first sidewall intersecting the first surface at a first edge. A transmitter is provided on the first sidewall of the substrate. The transmitter generates acoustic waves that propagate directly from the first sidewall through at least a portion of the touch sensitive region.

10 Claims, 17 Drawing Sheets

U.S. PATENT DOCUMENTS

| | | | | |
|---|---|---|---|---|
| 5,573,077 | A | 11/1996 | Knowles | 178/18.04 |
| 5,591,945 | A | 1/1997 | Kent | 178/18.04 |
| 5,708,461 | A | 1/1998 | Kent | 345/177 |
| 5,739,479 | A | 4/1998 | Davis-Cannon et al. | 178/18.04 |
| 5,852,433 | A | 12/1998 | Toda | |
| 5,854,450 | A | 12/1998 | Kent | 178/18.04 |
| 5,874,869 | A * | 2/1999 | Ueda et al. | 333/193 |
| 5,883,457 | A | 3/1999 | Rinde et al. | 310/313 D |
| 5,986,224 | A | 11/1999 | Kent | 178/18.04 |
| 6,004,474 | A | 12/1999 | Tanenaka et al. | 252/62.9 R |
| 6,087,599 | A * | 7/2000 | Knowles | 178/18.04 |
| 6,091,406 | A | 7/2000 | Kambara et al. | 345/177 |
| 6,194,809 | B1 * | 2/2001 | Takeuchi et al. | 310/313 R |
| 6,235,801 | B1 | 5/2001 | Morales et al. | 521/54 |
| 6,236,391 | B1 | 5/2001 | Kent et al. | 345/177 |
| 6,254,105 | B1 | 7/2001 | Rinde et al. | 277/628 |
| 6,258,291 | B1 | 7/2001 | Kimura et al. | 252/62.9 R |
| 6,313,829 | B1 | 11/2001 | Tolt et al. | 345/177 |
| 6,366,277 | B1 | 4/2002 | Armstrong | 345/177 |
| 6,396,484 | B1 | 5/2002 | Adler et al. | 345/177 |
| 6,411,287 | B1 | 6/2002 | Scharff et al. | 345/177 |
| 6,441,559 | B1 | 8/2002 | Adler et al. | 345/177 |
| 6,473,075 | B1 | 10/2002 | Gomes et al. | 345/177 |
| 6,512,323 | B2 | 1/2003 | Forck et al. | |
| 6,630,929 | B1 | 10/2003 | Adler et al. | 345/177 |
| 6,636,201 | B1 | 10/2003 | Gomes et al. | 345/173 |
| 6,756,973 | B2 | 6/2004 | Sano et al. | 345/177 |
| 6,759,928 | B2 | 7/2004 | Endou et al. | 333/193 |
| 7,030,860 | B1 | 4/2006 | Hsu et al. | |
| 2001/0054305 | A1 | 12/2001 | Banda et al. | |
| 2002/0101408 | A1 | 8/2002 | Sano et al. | 345/173 |
| 2002/0104691 | A1 | 8/2002 | Kent et al. | 178/18.04 |
| 2002/0171635 | A1 | 11/2002 | Takahashi et al. | |
| 2003/0164820 | A1 * | 9/2003 | Kent | 345/177 |
| 2004/0263490 | A1 | 12/2004 | Kent et al. | 345/177 |
| 2005/0073505 | A1 | 4/2005 | Katsuki et al. | |
| 2005/0190161 | A1 | 9/2005 | Hong et al. | |
| 2005/0243071 | A1 | 11/2005 | Kent et al. | 345/177 |

FOREIGN PATENT DOCUMENTS

| | | |
|---|---|---|
| JP | 8-305482 A | 11/1996 |
| JP | 10-211705 A | 8/1998 |
| WO | WO84/00427 A1 | 2/1984 |
| WO | WO 98/29853 A | 7/1998 |
| WO | WO01/02944 | 1/2001 |

OTHER PUBLICATIONS

M. de Billy, "Acoustic Technique Applied to the Measurement of the Free Edge Wave Velocity", *Ultrasonics*, IPC Science and Technology Press, Ltd., vol. 34, No. 6, Aug. 1996, pp. 611-619.

P. Lagasse et al., IEEE Transactions on Sonics and Ultrasonics, vol. SU-20(2), Apr. 1973, pp. 143-154.

International Search Report for International Application No. PCT/US2005/012891, mailed Feb. 9, 2006.

Search Report for British Patent Application No. GB0816653.0, conducted Sep. 26, 2008 and mailed Sep. 29, 2008.

* cited by examiner

ACOUSTIC TOUCH SENSOR

CROSS-REFERENCE TO RELATED APPLICATIONS

This application is related to U.S. Provisional Patent Application Ser. No. 60/562,461, entitled "Acoustic Touch Sensor," filed Apr. 14, 2004, and U.S. Provisional Patent Application Ser. No. 60/562,455, entitled "Acoustic Touch Sensor," filed Apr. 14, 2004, and to U.S. patent application Ser. No. 11/106,167, entitled "Acoustic Touch Sensor", filed contemporaneously with this application, the disclosures of which are incorporated herein by reference.

BACKGROUND OF THE INVENTION

1. Field of the Invention

This invention relates to touch sensors, in particular to acoustic touch sensors and acoustic touchscreens having narrow functional borders and increased touch-sensitive areas.

2. Introduction to the Invention

An acoustic touch sensor has a touch sensitive area on which the presence and location of a touch is sensed by the touch's effect on the transmission of acoustic waves across a touch sensor substrate. Acoustic touch sensors may employ Rayleigh waves (including quasi-Rayleigh waves), Lamb or shear waves, or a combination of different types of the acoustic waves.

FIG. 1 illustrates the operation of a conventional acoustic touch sensor, an acoustic touchscreen 1. The touchscreen 1 has a touch-sensitive area 2 inside of which two-dimensional coordinates of touches are determined. For example, the touch-sensitive area 2 may include the region bounded by the dashed line 16 which represents the inner boundary of a bezel 10. A first transmitting transducer 3a is positioned outside of touch-sensitive area 2 and is acoustically coupled to the surface of touchscreen 1. The transducer 3a sends an acoustic signal in the form of an acoustic wave 11a traveling parallel to the top edge of touchscreen 1 and generally in the plane of touchscreen 1. Aligned in the transmission path of acoustic wave 11a is a first linear array 13a of partially acoustically reflective elements 4, each of which partially transmits the acoustic signals and partially reflects them (by an angle of approximately 90°), creating a plurality of acoustic waves (e.g., 5a, 5b and 5c) traveling vertically across touch-sensitive area 2. The spacing of reflective elements 4 is variable to compensate for the attenuation of the acoustic signals with increasing distance from first transmitter 3a. It is also well known even if reflective elements 4 are uniformly spaced, signal equalization may be achieved by varying the reflective strength of reflective elements 4. Acoustic waves 5a, 5b, and 5c are again reflected by an angle of approximately 90° (see arrow 11b) by a second linear array 13b of partially acoustically reflective elements 4 towards a first receiving transducer 6a upon reaching the lower edge of touchscreen 1. At the receiving transducer 6a, the waves are detected and converted to electrical signals for data processing. Similar arrangements of reflective elements are located along the left and right edges of touchscreen 1. A second transmitting transducer 3b generates an acoustic wave 12a along the left edge, and a third linear array 13c of partially acoustically reflective elements 4 creates a plurality of acoustic waves (e.g., 7a, 7b, and 7c) traveling horizontally across touch-sensitive area 2. Acoustic waves 7a, 7b, and 7c are redirected along 12b by a fourth linear array 13d of partially acoustically reflective elements 4 towards receiving transducer 6b, where they are detected and converted to electrical signals for data processing.

If touch-sensitive area 2 is touched at position 8 by an object such as a finger or stylus, a portion of the energy of the acoustic waves 5b and 7a is absorbed by the touching object. The resulting attenuation is detected by receiving transducers 6a and 6b as a perturbation in the acoustic signal. A time delay analysis of the data with the aid of a microprocessor (not shown) allows determination of the coordinates of touch position 8. The device of FIG. 1 can also function as a touchscreen with only two transducers using a transmit/receive transducer scheme.

A housing 9, indicated by dashed lines in FIG. 1, may be associated with touchscreen 1. The housing can be made of any suitable material, for example molded polymer or sheet metal. The housing 9 includes a bezel 10, indicated by dashed line 16 representing an inner boundary of bezel 10 and dashed line 17 indicating an outer boundary of bezel 10 in FIG. 1. The inner dashed line 16 shows that the housing 9 overlays a periphery of touchscreen 1, concealing the transmitting and receiving transducers, the reflective elements, and other components, but exposing touch-sensitive area 2. This arrangement can protect the concealed components from contamination and/or damage, provide an aesthetic appearance, and define the touch-sensitive area for the user.

A touchscreen may comprise a separate faceplate overlaid on a display panel. The faceplate is typically made of glass, but any other suitable substrate may be used. The display panel may be a cathode ray tube (CRT), a liquid crystal display (LCD), plasma, electroluminescent, organic light-emitting-diode (OLED) display, or any other type of display.

As shown in FIG. 1, the touch sensitive area 2 is surrounded by border regions 15 where the reflective elements 4 and the transmitting and receiving transducers 3a, 3b, 6a and 6b are located. Reducing the width of border regions 15 increases the touch sensitive area 2. For touch sensor applications using transparent touch sensors such as touchscreens, the width of the border can be especially important. A touch sensor with narrowed border regions 15 can be integrated into display monitors that themselves have a narrow border around the displayed image. This feature is desirable as the general market trend for devices such as monitors is towards sleeker and more mechanically compact designs. A touch sensor with narrowed border regions 15 also is more easily sealed as well as being lighter and can have increased sensor area. Amongst competing touchscreen technologies, (e.g., acoustic, capacitive, resistive and infrared) acoustic touchscreens tend to have wider borders.

It is known to mount transducers used for transmitting and receiving acoustic waves substantially on the top touch sensitive surface of a substrate of an acoustic touch sensor. Transmitter-to-detector pathways may be used for the acoustic waves instead of incorporating reflective arrays for directing acoustic waves across a touch sensitive region of the touch sensor, but a large number of transducers may be required to be used. The transducers are wedge transducers mounted on the touch surface, thereby taking up valuable border space. Interdigital transducers may be used to design touchscreens that do not use reflective arrays, as disclosed in U.S. Pat. No. 6,756,973, the disclosure of which is incorporated herein by reference. The interdigital transducers disclosed therein are placed on the touch surface of the touchscreen thereby taking up valuable border space. To date, touch sensors using few transducers and incorporating reflective arrays to direct acoustic energy across the touch sensor have located the arrays on the borders of the same surface of the substrate as the touch sensitive region, thereby occupying border space.

It is known to mount transducers used for transmitting and receiving acoustic waves on the sidewalls of a substrate of an acoustic touch sensor. However, in both cases, the reflective arrays must be placed on the touch surface thereby taking up valuable border space.

It is possible to reduce the size of the border region on the touch surface of a touchscreen by using a waveguide to concentrate an acoustic wave in the border region, as disclosed in U.S. Pat. No. 6,636,201, the disclosure of which is incorporated herein by reference. However, alternate solutions may be desired which do not require providing a waveguide on the surface of the touch sensor substrate.

In addition to reducing the border region of a touch sensor, it is desired to make a touch sensor as flat as possible. This is especially advantageous for integrating a touch sensor with an LCD panel to make a touchscreen. If the touch sensor is very flat and parallel to the LCD panel, the two are easily combined into a compact system that can be easily sealed. If the touch sensor has bulky bezels and border regions, sealing of the touch sensor to the LCD panel may be complicated.

For the reasons outlined above, it is desirable to have new acoustic touch sensor designs capable of accommodating a very narrow border region. In addition, it is desirable to have new acoustic touch sensor designs in which the sensor is flat, allowing it to be easily integrated and sealed with planar devices, such as an LCD monitor.

BRIEF SUMMARY OF THE INVENTION

In one embodiment, a touch sensor comprises a substrate capable of propagating acoustic waves. The substrate includes a first surface having a touch sensitive region and a first sidewall intersecting the first surface at a first edge. A transmitter is provided on the first sidewall of the substrate. The transmitter generates acoustic waves that propagate directly from the first sidewall through at least a portion of the touch sensitive region.

In another embodiment, a touch sensor system comprises a substrate capable of propagating acoustic waves. The substrate includes a first surface having a touch sensitive region. First and second sidewalls intersect the first surface. A transmitter is provided on the first sidewall of the substrate. The transmitter generates acoustic waves that propagate directly from the first sidewall, and the acoustic waves propagate across at least a portion of the touch sensitive region. A detector is provided on the second sidewall of the substrate for detecting the acoustic waves after traversing at least a portion of the touch sensitive region.

In another embodiment, a method for detecting a touch on a touch sensitive region of a substrate capable of propagating acoustic waves. The substrate includes a first surface having the touch sensitive region, and first and second sidewalls intersect the first surface. An acoustic wave is generated proximate the first sidewall of the substrate. The acoustic wave is directed through a portion of the first sidewall of the substrate into the substrate and across at least a portion of the touch sensitive region. The acoustic wave is detected proximate the second sidewall of the substrate.

BRIEF DESCRIPTION OF THE DRAWINGS

The foregoing summary, as well as the following detailed description of certain embodiments of the present invention, will be better understood when read in conjunction with the appended drawings. It should be understood that the present invention is not limited to the arrangements and instrumentality shown in the attached drawings.

DETAILED DESCRIPTION OF THE INVENTION

Figure 1:
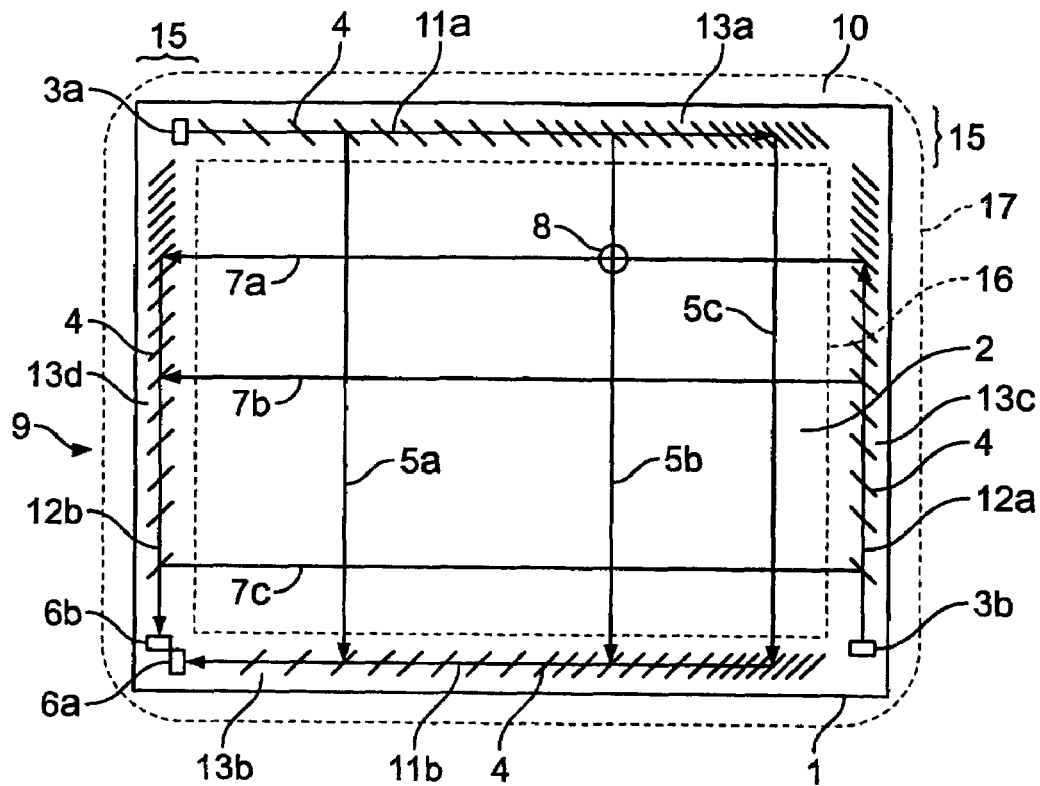
FIG. 1 illustrates the operation of a conventional acoustic touch sensor, an acoustic touchscreen.

Conventional reflective arrays as shown in FIG. 1 range in width between about 5 mm and 15 mm, which corresponds to a range of about 9-26 acoustic wavelengths (assuming a conventional frequency of about 5 MHz, corresponding to a wavelength of about 0.57 mm). The reflective arrays having narrower widths are typically used on smaller screens.

Figure 2:
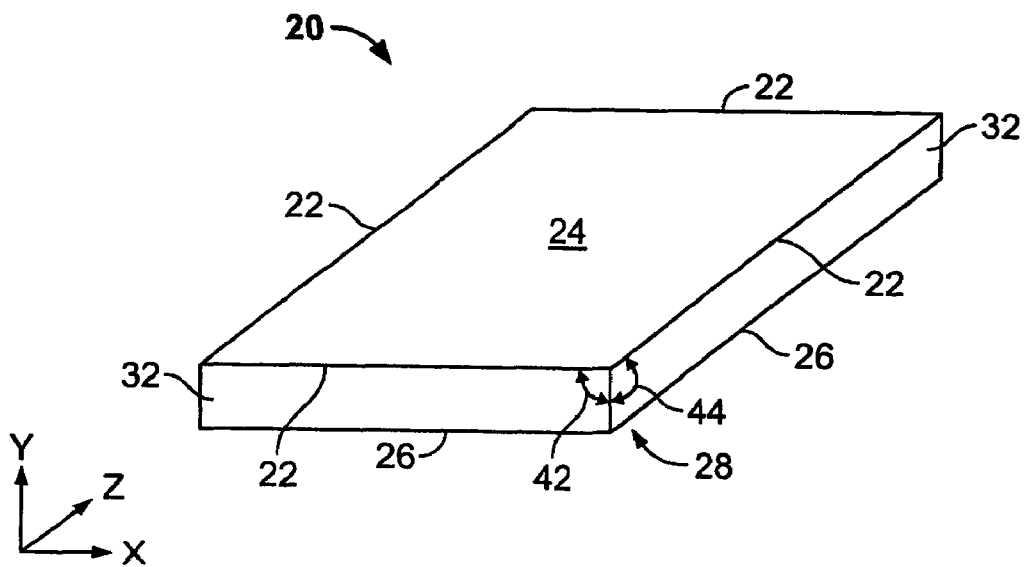
FIG. 2 illustrates a touch sensor substrate having a touch surface, edges, and sidewalls in accordance with an embodiment of the present invention.

FIG. 2 illustrates a touch sensor substrate 20 having a touch surface 24, edges 22, and sidewalls 32 in accordance with an embodiment of the present invention. Opposing edges 26 are formed on the substrate 20 at an intersection between a plane corresponding to a second surface 28 of the substrate 20 and the planes corresponding to each of the sidewalls 32. Any suitable material can be used for the substrate 20, including glass, ceramic, and metals (e.g., aluminum or steel). For some applications, low acoustic loss glass may be desired. For example, borosilicate glasses have low loss, and can provide increased received signal amplitudes that may in turn enable larger touch sensor areas.

Angles 42 and 44 formed where the sidewalls 32 abut the touch surface 24 are 90°, or within 20° of 90°, making sidewalls 32 vertical or substantially vertical with respect to the touch surface 24. The sidewalls 32 are formed to be substantially free of defects, such that any deviations on the sidewalls 32 such as chips, striations, dents, uneven regions, and the like have dimensions less than the acoustic wavelength, e.g., a Rayleigh wavelength, preferably less than 20% of a Rayleigh wavelength.

The clean sidewalls 32 may be formed by any method suitable for the material from which the substrate 20 is manufactured. For example, glass may be cut and machined to provide clean sidewalls 32. Optionally, the glass may be scribed and broken which, if carefully done, can produce a clean edge 22 opposite the scribed surface. Alternatively, a clean sidewall 32 may be formed by propagating a controlled fracture using thermal stress, for example by utilizing localized laser heating and gas jet cooling processes. In addition, the edges 22 may also be formed to be substantially free of defects in a manner similar to the clean sidewalls 32.

Figure 3:
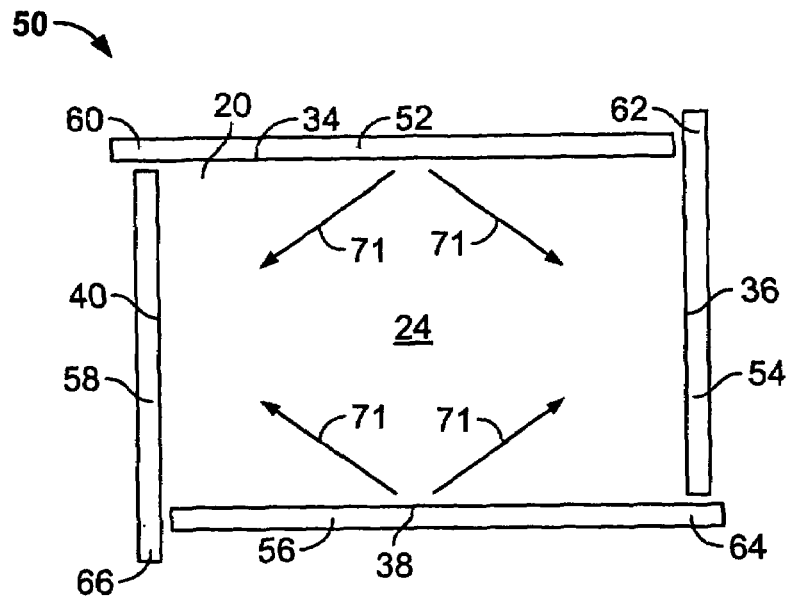
FIG. 3 illustrates a touch sensor having mechanisms for generating or detecting acoustic waves formed on the sidewalls in accordance with an embodiment of the present invention.

FIG. 3 illustrates a touch sensor 50 having mechanisms 52-58 for generating or detecting acoustic waves formed on the sidewalls 32 in accordance with an embodiment of the present invention. The sidewalls 32 have been indicated as sidewalls 34-40 for clarity. The touch sensor 50 comprises the substrate 20 having the touch sensitive surface 24. Each of the mechanisms 52-58, disposed on the sidewalls 34-40, respectively, generates and/or detects acoustic waves. Therefore, it is not necessary to form any mechanism, such as a reflective array, on the touch surface 24 of the substrate 20. Optionally, each mechanism 52-58 has a tab 60-66 extending beyond the substrate 20 for making electrical connection thereto.

By way of example only, two of the mechanisms 52 and 56 may generate acoustic waves and two of the mechanisms 54 and 58 may detect acoustic waves. The mechanisms 52 and 56 launch the acoustic waves, such as bulk shear waves, in directions that are generally parallel to one of the diagonals of the rectangular substrate 20 as indicated by the arrows 71.

Figure 4:
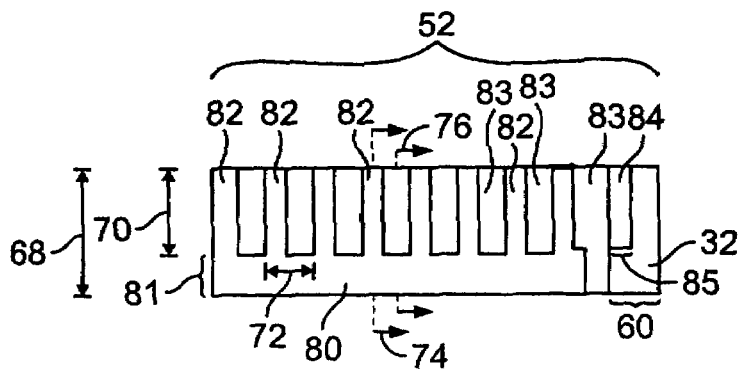
FIG. 4 illustrates a mechanism for generating or receiving an acoustic wave formed on a sidewall in accordance with an embodiment of the present invention.

FIG. 4 illustrates a mechanism 52 for generating or receiving an acoustic wave formed on a sidewall 32 in accordance with an embodiment of the present invention. A first conducting layer, or first electrode 84, is disposed on sidewall 32. The first electrode 84 may be formed to cover all, or nearly all, of the surface of the sidewall 32. On top of the first electrode 84 is applied a layer of piezoelectric material 83 (e.g., a piezoelectric polymer film or a fired-on piezoceramic material). A portion 85 of the first electrode 84 may extend beyond the piezoelectric layer 83 to allow electrical connection to be made, such as at the tab 60. A second electrode 80 having a base portion 81 and periodic structures, such as fingers 82, extending therefrom is disposed along the sidewall 32 on top of the piezoelectric layer 83. The second electrode 80 may be formed of a material such as copper. The fingers 82 act as a phased array of transmitters or receivers coherently generating or receiving acoustic waves in desired directions. Alternatively, the mechanism 52 in FIG. 4 may be formed as a piezo strip separate from the substrate 20 similar to the piezo strips discussed below for FIGS. 9 and 12-14.

The mechanism 52 may be used to generate and receive shear waves, Lamb waves, or Rayleigh waves. An oscillating voltage (not shown) may be applied to the second electrode 80 while the first electrode 84 is connected to ground. The application for shear waves will be discussed in more detail below. If being used for shear waves, the mechanism 52 is optimized if the base portion 81 is made to be small such that a length 70 of the fingers 82 extends along nearly the entire height of the sidewalls 32, or a depth 68 of the substrate 20. However, as Rayleigh waves are concentrated near the touch surface 24 of the substrate 20, if being used with Rayleigh waves, the mechanism 52 can be optimized by making the length 70 of the fingers 82 less than twice the wavelength $\lambda$, or less than the wavelength $\lambda$, of the acoustic waves. The fingers 82 may be spaced apart by a distance 72, measured center to center or end to end (as illustrated), wherein the distance 72 is larger than the wavelength $\lambda$ of the generated or received acoustic wave. The ratio $\lambda$/distance 72 equals the sine of the angle of emission or reception with respect to the normal to the substrate sidewall 32.

Figure 5:
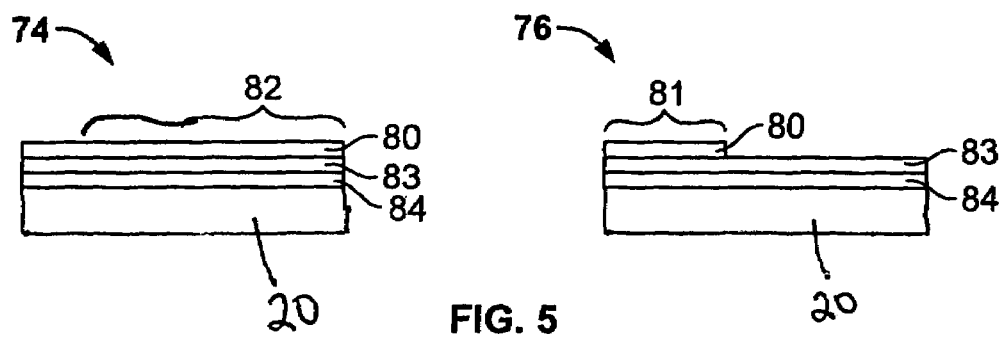
FIG. 5 illustrates cross sections of the layers on the substrate of FIG. 4 in accordance with an embodiment of the present invention.

FIG. 5 illustrates cross sections 74 and 76 of the layers on the substrate 20 of FIG. 4 in accordance with an embodiment of the present invention. The cross section 74 illustrates a portion including the finger 82 of the second electrode 80. The cross section 76 illustrates a portion between the fingers 82, wherein the second electrode 80 occupies the base portion 81.

Figure 6:
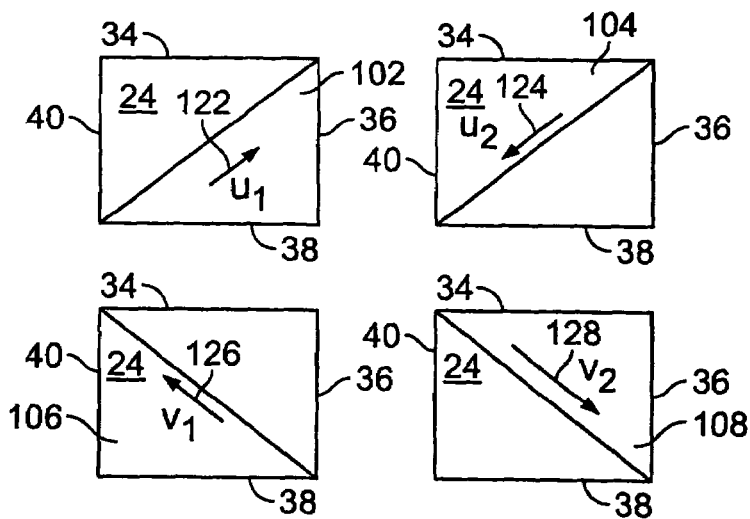
FIG. 6 illustrates touch areas on the touch surface of the substrate in accordance with an embodiment of the present invention.

FIG. 6 illustrates touch areas 102-108 on the touch surface 24 of the substrate 20 in accordance with an embodiment of the present invention. The sidewalls 34-40 have been indicated as in FIG. 3 for clarity. Each of the touch areas 102-108 is associated with a diagonal acoustic path "U" or "V" rather than conventional Cartesian "X" and "Y" coordinates. The arrows 122-128 indicate the directions of representative acoustic paths from one side to an adjacent side of the substrate 20. By way of example only, signals generated by a mechanism along sidewall 38 would generate U1 (touch area 102) and V1 (touch area 106) in the directions of arrows 122 and 126, to be received by mechanisms along sidewalls 36 and 40, respectively. Two-dimensional touch coordinates can be reconstructed from the four diagonal signals U1, U2, V1, and V2.

Figure 7:
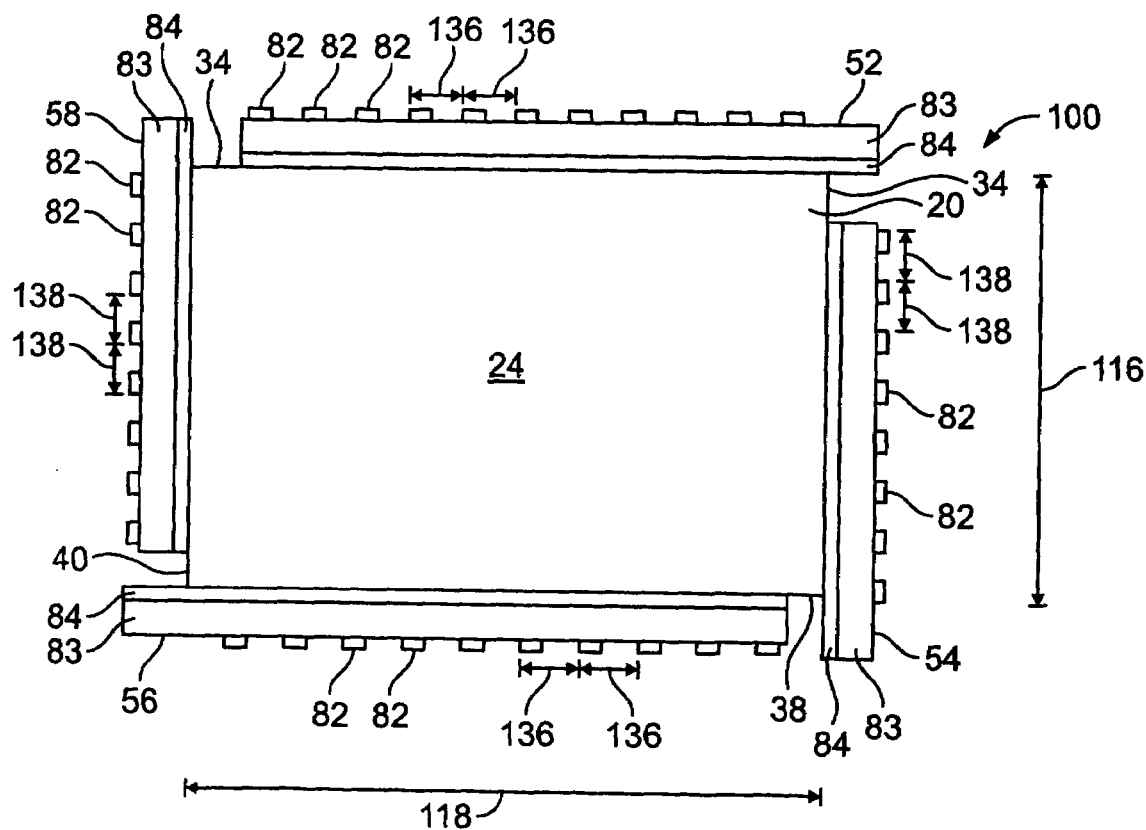
FIG. 7 illustrates a geometry of a touch sensor in which transmitting mechanisms are located on two of the sidewalls of the substrate, and receiving mechanisms are located on the other two sidewalls of the substrate, in accordance with an embodiment of the present invention.

FIG. 7 illustrates a geometry of a touch sensor 100 in which transmitting mechanisms 52 and 56 are located on the sidewalls 34 and 38 of the substrate 20, respectively, and receiving mechanisms 54 and 58 are located on the sidewalls 36 and 40 of the substrate 20, respectively, in accordance with an embodiment of the present invention. By way of example only, if the substrate 20 has a rectangular shape with a height 116 and width 118, such that the ratio is 3:4 (height:width), spacing 136 for the electrode fingers 82 on the transmitting mechanisms 52 and 56 is $5\lambda/4$, and spacing 138 for the electrode fingers 82 on the receiving mechanisms 54 and 58 is $5\lambda/3$. By spacing the electrode fingers 82 of the transmitting mechanisms 52 and 56 apart by a distance greater than 1 wavelength, coherent coupling in desired directions is achieved.

Figure 8:
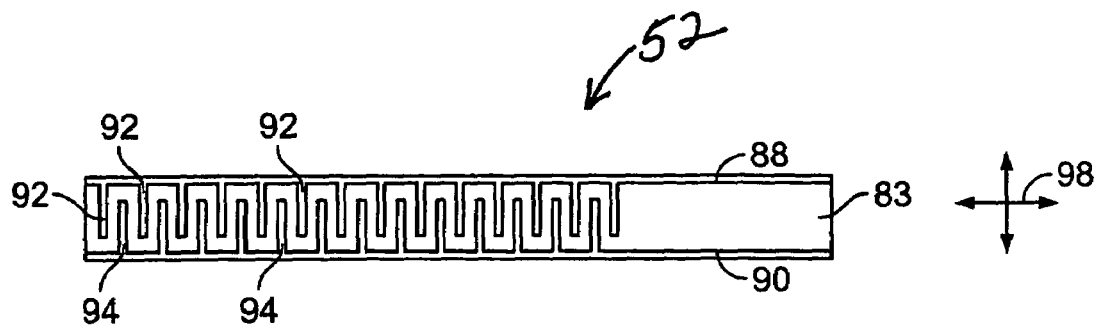
FIG. 8 illustrates the transmitting or receiving mechanism having interdigital electrodes in accordance with an embodiment of the present invention.

FIG. 8 illustrates the transmitting or receiving mechanism 52 having interdigital electrodes in accordance with an embodiment of the present invention. Piezoelectric material 83 may be applied over a ground electrode (not shown) A first electrode 88 and a second electrode 90 each form a series of periodic structures, such as interdigital electrodes having electrode fingers 92 and 94, respectively, formed over the piezoelectric material 83. The fingers 92 are regularly spaced with respect to each other, and the fingers 94 are regularly spaced with respect to each other, and the spacing is determined as previously described in FIG. 4. For example, the fingers 92 are spaced apart by the distance 72 (FIG. 4), wherein the distance between one finger 92 and a neighboring finger 94 is one-half the distance 72.

It is possible to have the transmitting and receiving mechanisms 52-58 assembled before disposing on the sidewall 32. For example, strips of polymer-film sensors can be used. A specific subset of polymers (a material having long chains with a carbon backbone) is piezoelectric, having the characteristic of expanding and contracting when subjected to an electric field. The piezo polymer is a continuous film which is insulating. These strips comprise a piezoelectric polymeric layer (e.g., polyvinylidene fluoride (PVDF) or a copolymer of vinylidene fluoride, for example a copolymer of vinylidene fluoride and trifluoroethylene, p(VDF-TrFE)). The piezoelectric material 83 is sandwiched between the ground electrode and the array of interdigital electrodes 88 and 90, which may be formed of copper trace or metalized aluminum. The piezoelectric material 83, or the polymer, is typically a thin dimension (e.g. 30 microns) compared to the width of the fingers 92 and 94. The strips can be disposed on the sidewalls 32 by any suitable method, preferably by using a layer that efficiently couples shear strains between the polymeric piezoelectric component and the substrate 20 (e.g., glass), for example by using a thin rigid adhesive layer. Electric connection from a controller (not shown) to the strips can be made via a flexible cable, and optionally by continuation of the same polymer-film substrate that also serves as the piezoelectric material of the transducer or mechanisms 52-58.

The ground electrode (not shown) is connected to ground and the fingers 92 and 94 are excited with opposite polarities. The mechanism 52 may transmit and/or receive acoustic waves, and the fingers 92 and 94 transmit 180° out of phase. When the first and second electrodes 88 and 90 are excited with the opposite phases, the polymer piezo, or the piezoelectric material 83, will tend to expand and contract in the plane indicated by arrows 98. For example, when a negative voltage is applied to the fingers 94, the piezoelectric material 83 shrinks. The fingers 92 and 94 also experience a small measure of expansion and contraction, but more importantly, corresponding stresses are applied to sidewalls 32 of substrate 20.

Figure 9:
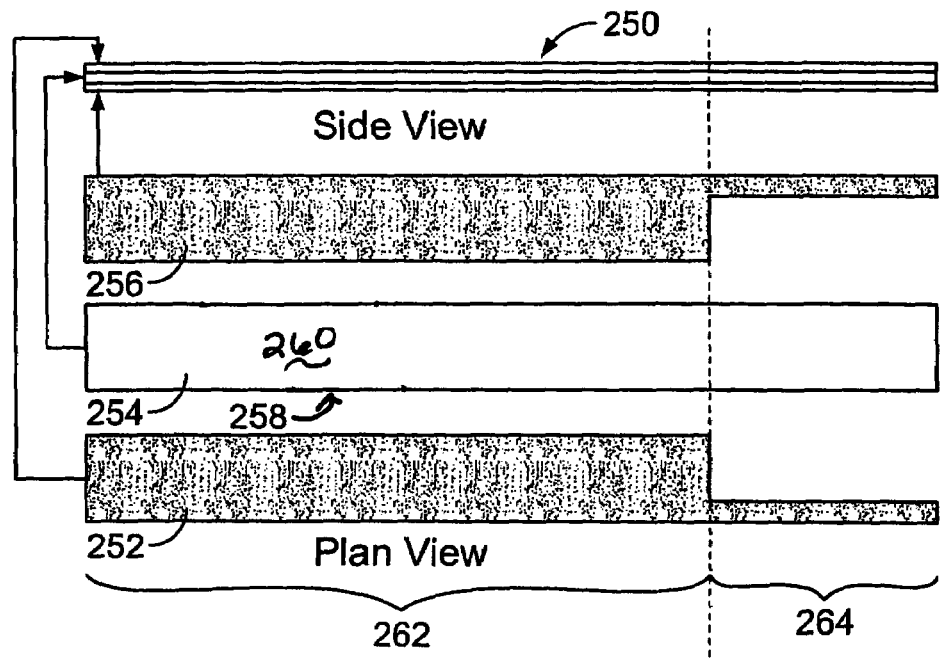
FIG. 9 illustrates a polymer-film pressure-mode piezo strip for generating and receiving diagonal acoustic path "U" or "V" coordinates in accordance with an embodiment of the present invention.

FIG. 9 illustrates a polymer-film pressure-mode piezo strip 250 for generating and receiving diagonal acoustic path "U" or "V" coordinates in accordance with an embodiment of the present invention. The piezo strip 250 is formed of a first electrode 252 applied to a first side 258 of a polymer piezo film 254. A second electrode 256 is applied to a second side 260 of the polymer piezo film 254. The piezo strip 250 may be flexible, allowing easier assembly and interconnection compared to rigid and/or brittle materials. A first portion 262 of the piezo strip 250 may be glued or otherwise adhered to the second surface 28 of the substrate 20 proximate the edges 22. A second portion 264 of the piezo strip 250 may extend beyond the substrate 20 to allow electrical connections (not shown) to be easily attached to the first and second electrodes 252 and 256.

The piezo strip 250 is formed separate from the substrate 20, allowing flexibility in manufacturing and assembly. Therefore, it is not necessary to consider warping and/or other destructive results which may occur within the substrate 20 due to the high temperatures used when curing materials comprising the piezo strip 250. This may allow additional materials to be considered for use as the substrate 20, opening possibilities in design of products, use environments, and the like.

Figure 10:
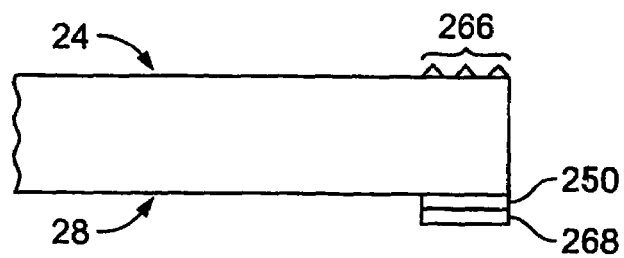
FIG. 10 illustrates a side-view of the substrate having the piezo strip attached to the second surface in accordance with an embodiment of the present invention.

FIG. 10 illustrates a side-view of the substrate 20 having the piezo strip 250 attached to the second surface 28 in accordance with an embodiment of the present invention. A grating 266 is formed on the touch surface 24 proximate the edge 22, and opposite the piezo strip 250. Optionally, a solid material 268 may be formed on or attached to the piezo strip 250, providing an inertial mass for the piezo strip 250 to push against to improve coupling efficiency.

Figure 11:
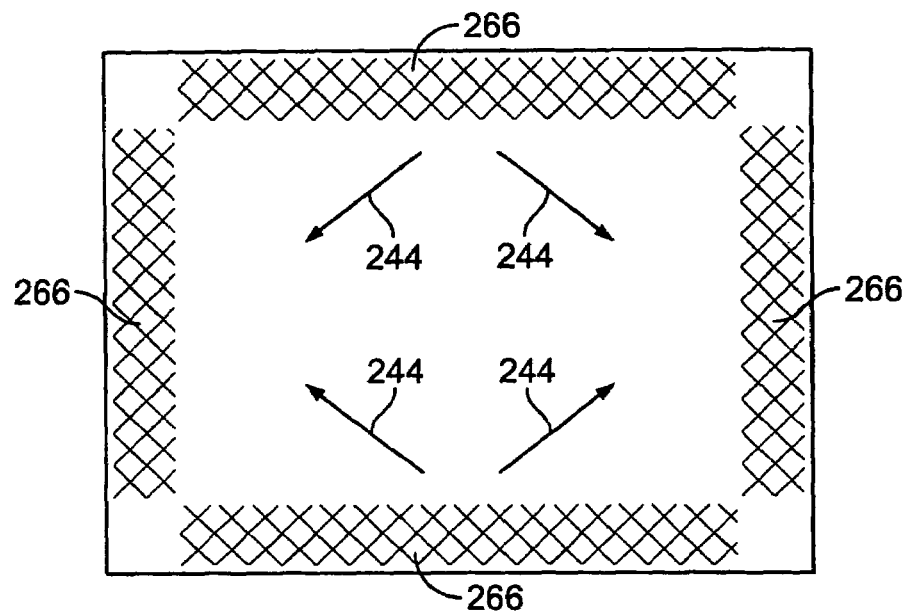
FIG. 11 illustrates the gratings formed on the touch surface in accordance with an embodiment of the present invention.

FIG. 11 illustrates the gratings 266 formed on the touch surface 24 in accordance with an embodiment of the present invention. The piezo strip 250 (not shown) has an active area corresponding to the first portion 262 of the piezo strip 250 and the area covered by the grating transducers 266. When the first and second electrodes 252 and 256 are excited, acoustic waves are generated in the directions of arrows 244.

Figure 12:
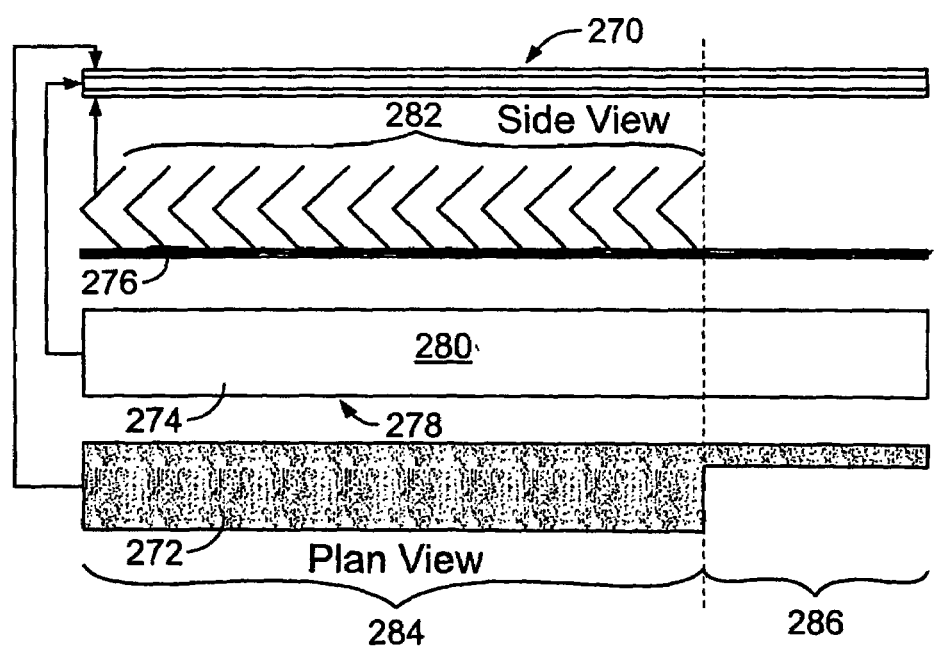
FIG. 12 illustrates an alternative polymer-film piezo strip for generating and receiving acoustic waves in accordance with an embodiment of the present invention.

FIG. 12 illustrates an alternative polymer-film piezo strip 270 for generating and receiving acoustic waves in accordance with an embodiment of the present invention. The piezo strip 270 is formed of a first electrode 272 applied to a first side 278 of a polymer piezo film 274. A second electrode 276 is applied to a second side 280 of the polymer piezo film 274. The second electrode 276 has fingers 282. A first portion 284 of the piezo strip 270 is fastened to the touch surface 24 of the substrate 20 proximate the edges 22. A second portion 286 of the piezo strip 270 may extend beyond the substrate 20 to allow electrical connections to be attached to the first and second electrodes 272 and 276.

Figure 13:
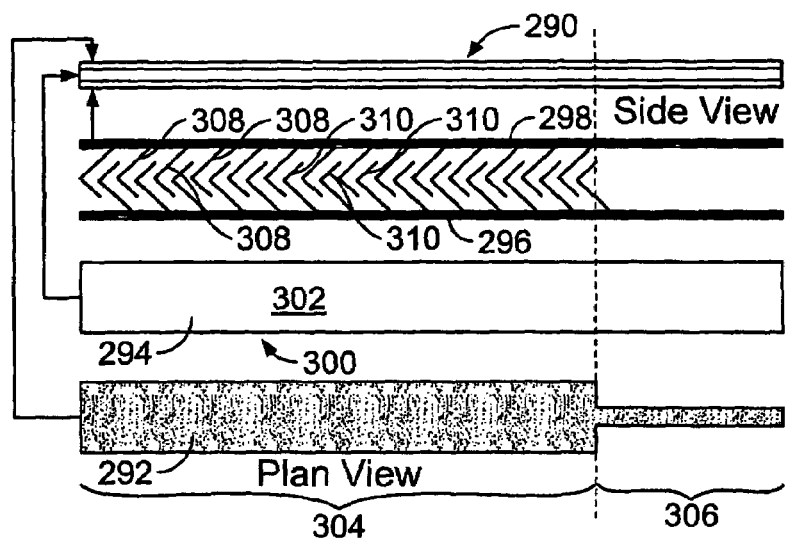
FIG. 13 illustrates an alternative polymer-film piezo strip for generating and receiving acoustic waves in accordance with an embodiment of the present invention.

FIG. 13 illustrates an alternative polymer-film piezo strip 290 for generating and receiving acoustic waves in accordance with an embodiment of the present invention. The piezo strip 290 is formed of a ground electrode 292 applied to a first side 300 of a polymer piezo film 294. First and second electrodes 296 and 298 have interdigital fingers 308 and 310 and are applied to a second side 302 of the polymer piezo film 294. A first portion 304 of the piezo strip 290 is fastened to the touch surface 24 of the substrate 20. A second portion 306 of the piezo strip 290 may extend beyond the substrate 20 to allow electrical connections to be attached to the ground electrode 292 and first and second electrodes 296 and 298.

Figure 14:
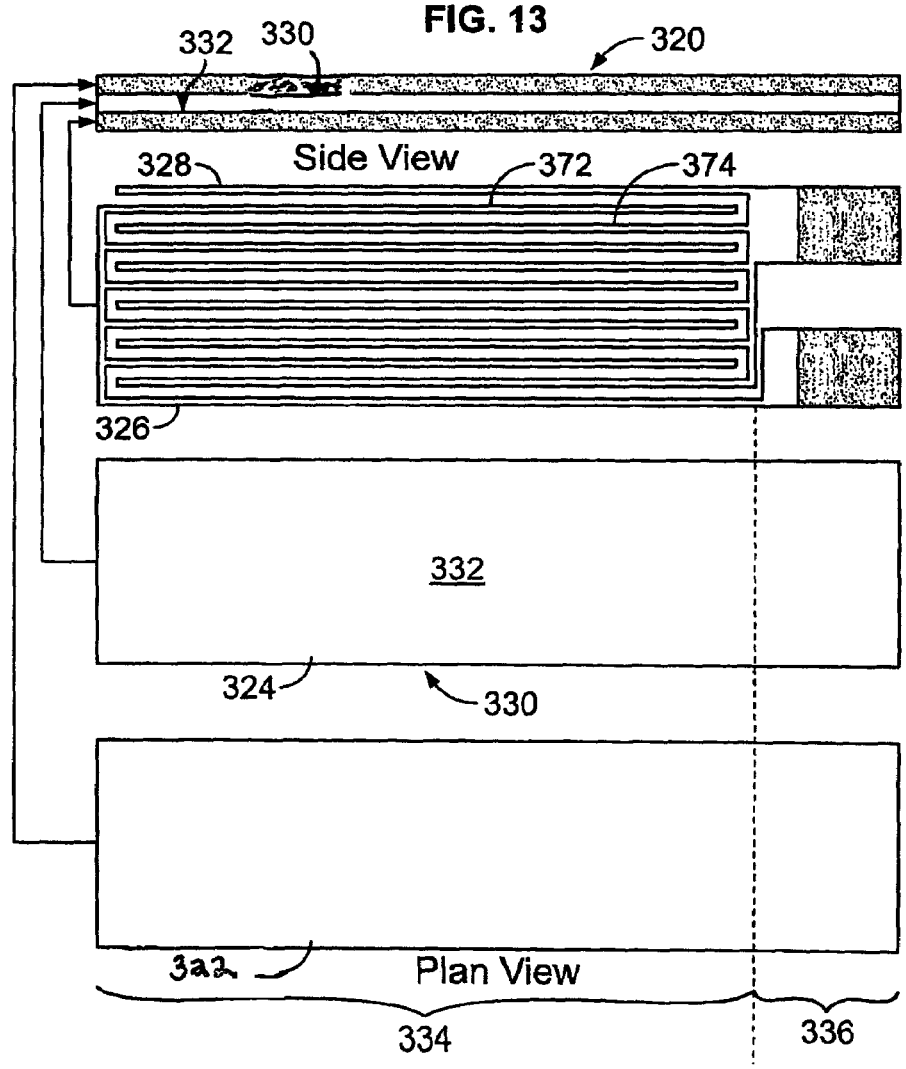
FIG. 14 illustrates a polymer-film piezo transducer for generating and receiving acoustic waves in accordance with an embodiment of the present invention.

FIG. 14 illustrates a polymer-film piezo transducer 320 for generating and receiving acoustic waves in accordance with an embodiment of the present invention. The piezo transducer 320 is formed of a ground electrode 322 applied to a first side 330 of a polymer piezo film 324. First and second electrodes 326 and 328 have interdigital fingers 372 and 374, and are applied to a second side 332 of the polymer piezo film 324. A first portion 334 of the piezo transducer 320 is fastened to the touch surface 34 of the substrate 20 proximate two or more of the corners of the substrate 20. A second portion 336 of the piezo transducer 330 may extend beyond the substrate 20 to allow electrical connections to be attached to the ground electrode 322 and first and second electrodes 326 and 328. To form a touch screen, the piezo transducer 320 may be combined with reflective arrays formed along the touch surface 24 proximate the edges 22, such as the linear arrays 13a-13d of FIG. 1 previously discussed.

Figure 15:
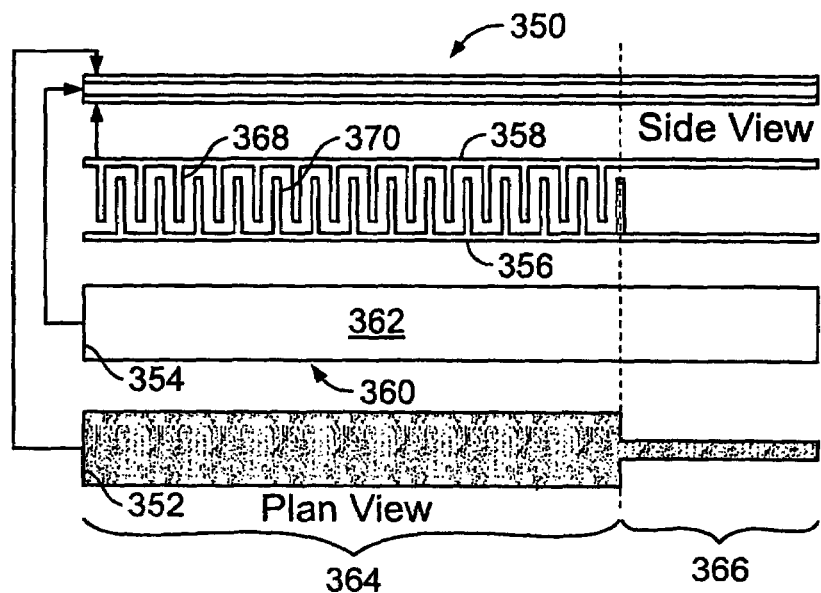
FIG. 15 illustrates an alternative polymer-film piezo strip for generating and receiving acoustic waves from the sidewall in accordance with an embodiment of the present invention.

FIG. 15 illustrates an alternative polymer-film piezo strip 350 for generating and receiving acoustic waves from sidewall 32 in accordance with an embodiment of the present invention. The piezo strip 350 is formed of a ground electrode 352 applied to a first side 360 of a polymer piezo film 354. First and second electrodes 356 and 358 have interdigital fingers 368 and 370 and are applied to a second side 362 of the polymer piezo film 354. A first portion 364 of the piezo strip 350 is fastened to the sidewall 32 of the substrate 20. A second portion 366 of the piezo strip 350 may extend beyond the substrate 20 to allow electrical connections to be attached to the ground electrode 352 and first and second electrodes 356 and 358. The piezo strip 350 bonded to the sidewall 32 is an option for the mechanism 52 of FIG. 3.

Figure 16:
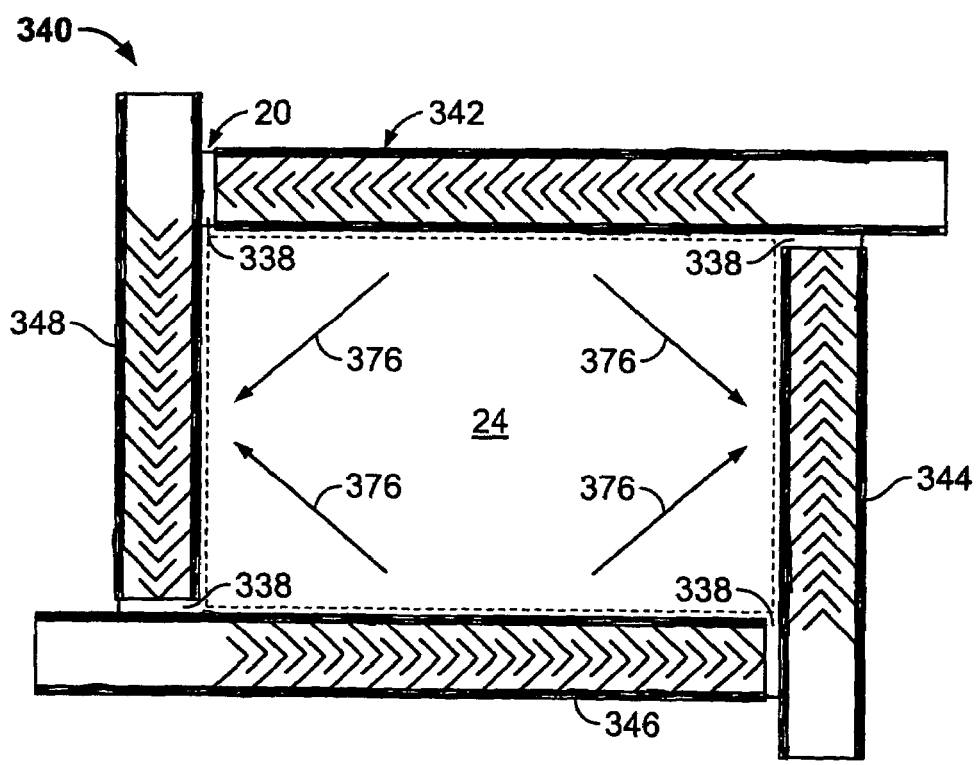
FIG. 16 illustrates a geometry of a touch sensor in accordance with an embodiment of the present invention.

FIG. 16 illustrates a geometry of a touch sensor 340 in accordance with an embodiment of the present invention. The touch sensor 340 comprises the substrate 20 having the touch surface 24. Piezo strips 342-348 have been attached, such as with an adhesive, to a perimeter 338 of the touch surface 24. By way of example only, the piezo strips 342-348 may be formed as one of the piezo strips illustrated in FIGS. 12 and 13. The strips 342-348 may generate and receive acoustic waves in the directions as indicated by arrows 376. It should be understood that the piezo strips 342-348 are drawn for clarity and are not shown to scale with respect to the touch sensor 340.

Figure 17:
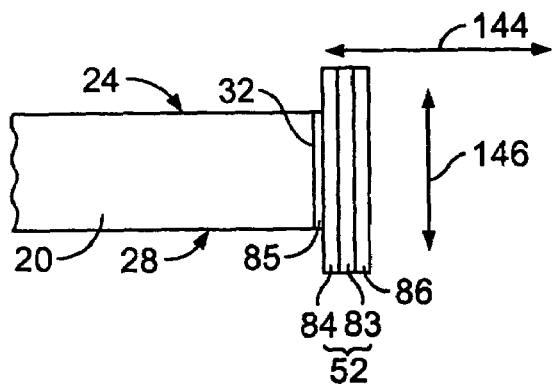
FIG. 17 illustrates a side view of a transmitting or receiving mechanism of FIG. 3 in accordance with an embodiment of the present invention.

FIG. 17 illustrates a side view of a transmitting or receiving mechanism 52 of FIG. 3 in accordance with an embodiment of the present invention. The mechanism 52 is formed having the first electrode 84, the piezoelectric layer 83 and an outer electrode 86, such as the interdigital first and second electrodes 88 and 90 as in FIG. 8 or the second electrode 80 as in FIG. 4. The first electrode 84 of the mechanism 52 is bonded to the sidewall 32 with an adhesive layer 85, such as an epoxy. Optionally, the mechanism 52 can extend beyond one or both of the plane of the touch surface 24 and the plane of the opposite side 28 of the substrate 20 to allow electrical connections to be attached to the electrodes 84 and 86.

Figure 18:
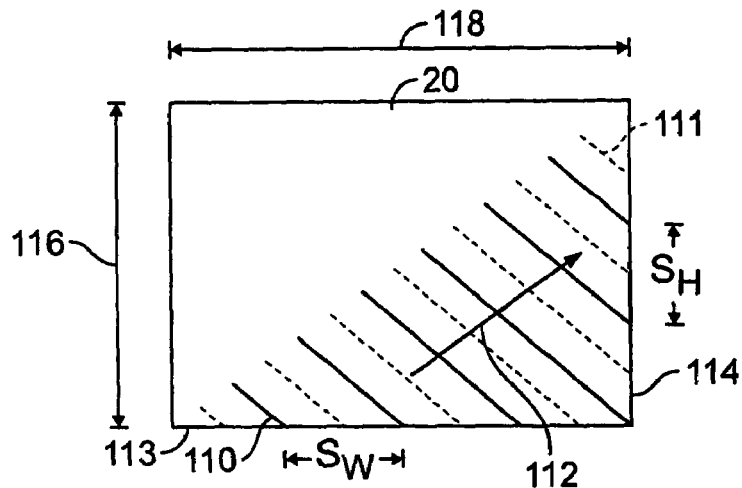
FIG. 18 illustrates spacing or distance between the electrode fingers (FIG. 4) for the U1 direction (FIG. 6) in accordance with an embodiment of the present invention.

FIG. 18 illustrates spacing or distance between the electrode fingers 82 (FIG. 4) for the U1 direction (FIG. 6) in accordance with an embodiment of the present invention. The spacing between the electrode fingers 82 as discussed previously in FIG. 4 (distance 72) can be tuned to transmit and receive zeroth order horizontally polarized shear (ZOHPS) waves, also known as GAW, at the desired angles to provide U and V acoustic paths as shown in FIG. 6. The substrate 20 has the height 116 and width 118. Solid lines 110 and dashed lines 111 represent maxima and minima (most negative amplitude with magnitude same as the maxima), respectively, in the acoustic waves generated from a horizontal side 113. The spacing between maxima as projected along a horizontal axis along the horizontal side 113 is shown as $S_W$. The acoustic waves launched from the horizontal side 113 then travel toward vertical side 114 as indicated by arrow 112. The spacing between maxima (and minima) as projected along the vertical side 114 is shown as $S_H$. The quantities $S_W$ and $S_H$ are given by the following equations:

$$S_W = \lambda (H^2 + W^2)^{1/2} / W$$

$$S_H = \lambda (H^2 + W^2)^{1/2} / H.$$

The wavelength $\lambda$ will be determined by the phase velocity V of the acoustic mode used in the touch sensor to sense touches and the operating frequency f by the relation $\lambda = V/f$. Setting the spacing of the electrode fingers 82 using the $S_W$ and $S_H$ as set out above will lead to coherent coupling to acoustic waves parallel to the diagonals of the rectangular touch surface 20 and will support the U1, U2, V1 and V1 signal paths which complete a two-dimensional coordinate measurement in the touch area.

Figure 19:
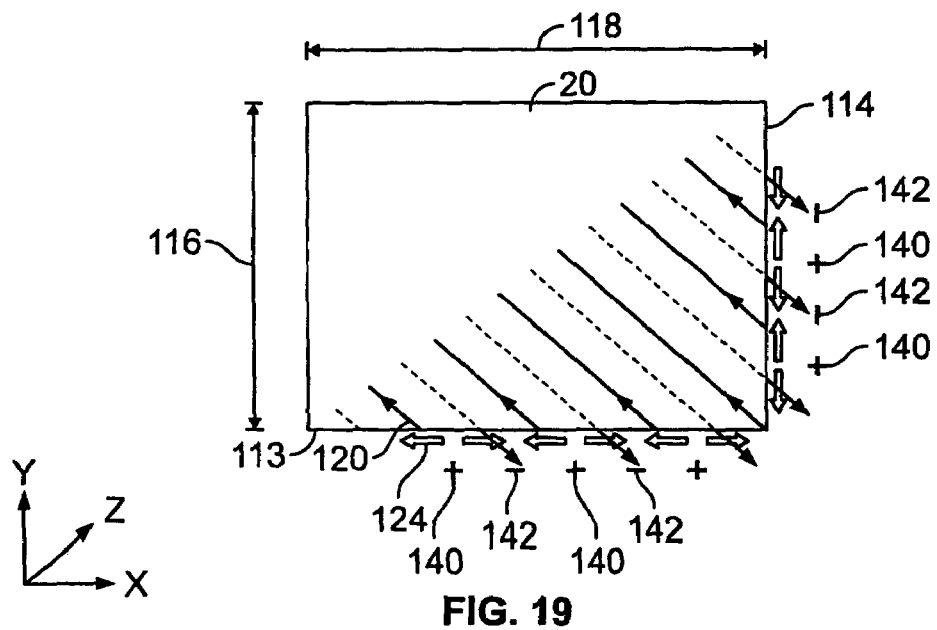
FIG. 19 illustrates a coupling mechanism in the U1 region between an acoustic wave and electric field-induced expansion and contraction of a piezoelectric film (e.g., a PVDF film or fired-on piezoceramic layer), such as piezoelectric material, in accordance with an embodiment of the present invention.

FIG. 19 illustrates a coupling mechanism in the U1 region between an acoustic wave and electric field-induced expansion and contraction of a piezoelectric film (e.g., a PVDF film or fired-on piezoceramic layer), such as piezoelectric material 83, in accordance with an embodiment of the present invention. Filled arrows 120 represent the motion of the shear acoustic wave. Hollow arrows 121 represent forces due to the transmitting mechanism 52 shown in FIG. 8, such as the interdigital electrodes 88 and 90 and the piezoelectric material 83, along the horizontal side 113. A similar receiving mechanism 52 is present along the vertical side 114. Regions of expansion 140 are indicated by plus symbols and regions of contraction 142 are indicated by minus symbols.

If the piezoelectric material 83 is a fired-on piezoelectric coating or a polymer layer such as PVDF, it is poled using an electric field to induce a dipole moment, in order to demonstrate piezoelectric behavior. Referring to FIG. 17, the piezoelectric material 83 is most easily poled using the available electrode structures, that is, in a direction 144 perpendicular to the sidewall 32. With the piezoelectric material 83 poled in the direction 144, applying voltage to the first electrode 84 and the outer electrode 86 will generally induce expansion or contraction both in the direction 144 parallel to the applied electric field (referred to herein as "33" coupling) as well as expansion or contraction in a direction 146 perpendicular to the electric field and parallel to the plane of sidewall 32 (referred to herein as "31" coupling). Depending on the nature of the piezoelectric material 83, the direction 146 of contraction or expansion due to the "31" coupling may be parallel or perpendicular (or both) to the touch surface 24 of substrate 20. All of these three types of piezoelectric coupling, namely "33" coupling and the two types of "31" coupling, are available to provide coupling to generate and receive the desired acoustic waves.

Returning to FIG. 19, a coupling mechanism between horizontally polarized shear waves, such as the zeroth order horizontally polarized shear (ZOHPS) wave, is illustrated. The filled arrows 120 represent the motion of the shear acoustic wave while the hollow arrows 121 represent forces due to "31" coupling of the piezo material 83 where the direction 146 is in the plane of the touch surface 24. While not shown, the "33" coupling in the piezoelectric material 83 can be used to generate acoustic waves by exciting the component of shear wave motion (indicated by the filled arrows 120) that is perpendicular to the sidewall 32. As diagonally propagating Rayleigh waves are associated with material motion at the sidewalls 32 along all three axes, the "33" coupling and both polarizations of the "31" coupling may be used to excite Rayleigh waves as well as Lamb waves.

By way of example only, the design of the touch sensor 50 or 100 is desired which makes use of the coupling that provides the most efficient generation and reception of the desired acoustic mode with minimal coupling to undesired parasitic acoustic modes. In addition, the design of a transducer, such as the mechanism 52 and others previously discussed, depends in part on the depth profile of the desired mode. For example, shear waves may move through all or a large portion of the depth of the substrate 20, while Rayleigh waves couple only near the touch surface 24 of the substrate 20.

Figure 20:
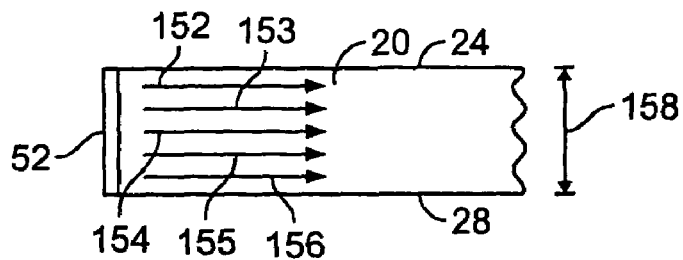
FIG. 20 illustrates an acoustic power density of zeroth order horizontally polarized shear waves (ZOHPS or sometimes referred to commercially as "GAW") within the substrate in accordance with an embodiment of the present invention.

FIG. 20 illustrates an acoustic power density of a zeroth order horizontally polarized shear waves (ZOHPS or sometimes referred to commercially as "GAW") within the substrate 20 in accordance with an embodiment of the present invention. The ZOHPS or GAW has a uniform acoustic power density throughout the bulk of the substrate 20, as illustrated by arrows 152-156. To excite and detect this acoustic wave, it is preferable for the active transmitting or receiving mechanism 52 (which can comprise a layer of piezoelectric material 83) to couple uniformly in depth 158 along the sidewall 32.

Figure 21:
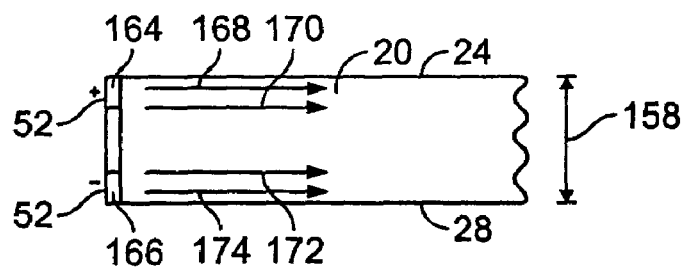
FIG. 21 illustrates transmission of higher order plate waves in accordance with an embodiment of the present invention.

FIG. 21 illustrates transmission of higher order plate waves in accordance with an embodiment of the present invention. The mechanism 52 has first and second piezoelectric elements 164 and 166 having opposite polarity. The first and second piezoelectric elements 164 and 166 are formed on the sidewall 32 proximate the top (the touch surface 24) and bottom (the second surface 28) of the substrate 20 to transmit higher order horizontally polarized shear waves (or another higher order plate wave) as illustrated by arrows 168 and 170 proximate the touch surface 24 and arrows 172 and 174 proximate the second surface 28.

Figure 22:
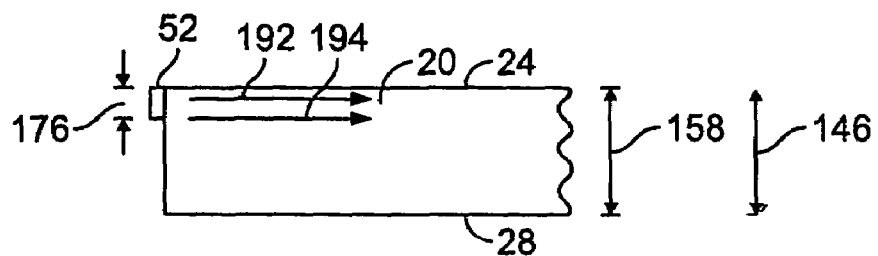
FIG. 22 illustrates transmission of Rayleigh waves in accordance with an embodiment of the present invention.

FIG. 22 illustrates transmission of Rayleigh waves in accordance with an embodiment of the present invention. The acoustic power in Rayleigh waves is concentrated near the touch surface 24, as illustrated by arrows 192 and 194. For "31" coupling where the direction 146 is perpendicular to the touch surface 24, it is desirable to limit the active area of piezoelectric material 83 of the mechanism 52 to within approximately one Rayleigh wavelength λ 176 of the touch surface 24 of substrate 20. It should be understood that although the mechanism 52 is illustrated as being only one Rayleigh wavelength λ 176 in depth 158, the mechanism 52 may have a larger dimension along the depth 158 while still limiting the active area of the piezoelectric material 83 to within the area of approximately one Rayleigh wavelength λ 176 of the touch surface 24.

Figure 23:
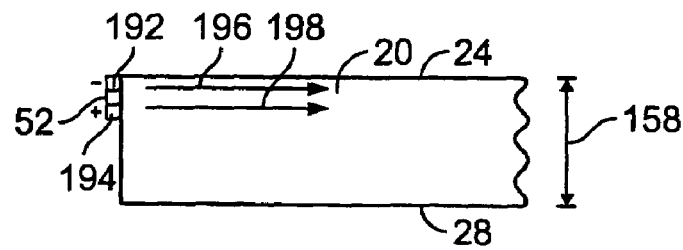
FIG. 23 illustrates the piezoelectric material of the mechanism coupling to Rayleigh waves primarily via "33" coupling in accordance with an embodiment of the present invention.

FIG. 23 illustrates the piezoelectric material 83 of the mechanism 52 coupling to Rayleigh waves primarily via "33" coupling in accordance with an embodiment of the present invention. The phase of Rayleigh wave longitudinal motion, as indicated by arrows 196 and 198, flips polarity sign with depth 158. Therefore, the layer of active piezoelectric material 83 of the mechanism 52 is excited with different polarities at different depths. In general, a combination of simulation studies and experimental studies may be used to determine the structure of the layer of the active piezoelectric material 83 of the mechanism 52 as a function of the desired acoustic mode and the piezoelectric properties of the poled piezoelectric layer.

Figure 24:
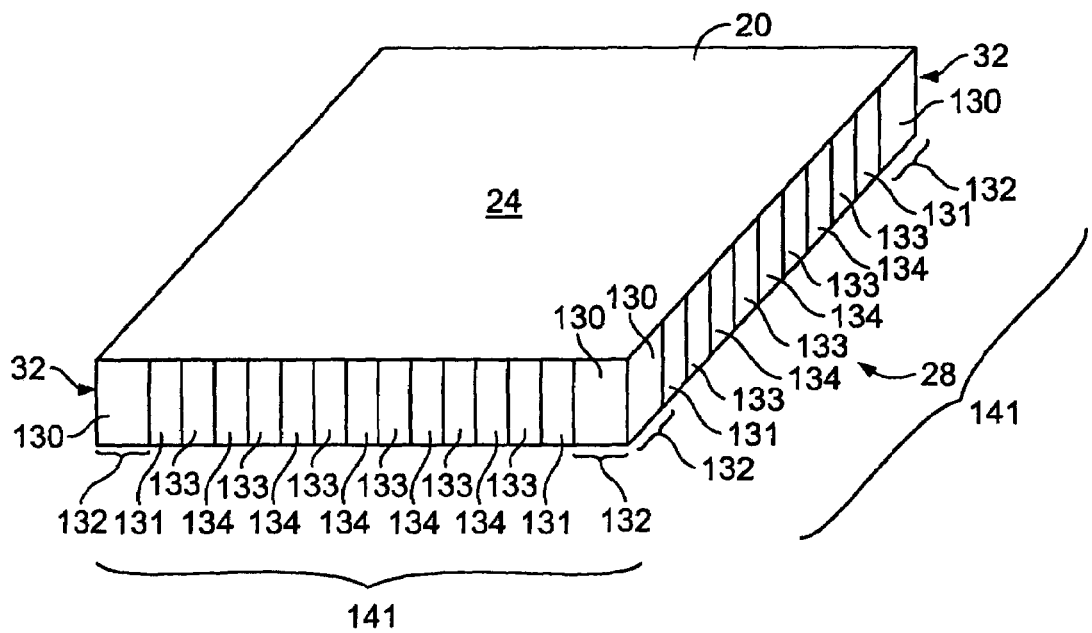
FIG. 24 illustrates a transducer structure having a periodic modulation layer in accordance with an embodiment of the present invention.

FIG. 24 illustrates a transducer structure having a periodic modulation layer 134 in accordance with an embodiment of the present invention. A substrate 20 as shown in FIG. 2 can be used. As described above, the substrate 20 can be any suitable material, including glass, ceramic, and metals such as aluminum or steel. For some applications, low acoustic loss glass may be desired. As described above, the sidewalls 32 of the substrate are clean.

A first conductive layer 130 is provided (or applied) to each of the sidewalls 32 of the substrate 20 and will function as a first electrode for piezoelectric transducers. Any suitable conductive material can be used, such as silver fret, copper traces or screen-printable conductive printable inks. By way of example only, the first conductive layer 130 may be screen printable ink which is baked at a high temperature, such as 450° C. after application to the sidewalls 32.

A piezoelectric material layer 131 is then applied on the sidewalls 32 over the first conductive layer 130. Examples of materials that can be used for piezoelectric layer 131 include, but are not limited to, polymer piezoelectric materials as well as fired-on piezoceramic materials. Optionally, regions 132 may be left exposed near the corners to allow an electrical connection to the first conductive layer 130 to be made.

Next, a second conductive layer 133 is provided that will function as a second electrode for the piezoelectric transducers. Typically, the first conductive layer 130 will function as a ground electrode to minimize susceptibility to electromagnetic interference, and the second conductive layer 133 will function as an excitation electrode or received signal electrode. The second conductive layer 133 can be made of similar or identical materials as the first conductive layer 130. In contrast to electrode 80 shown in FIG. 4, the second conductive layer 133 is a continuous covering over the piezoelectric layer 131, and thus does not have an electrode structure of interdigital fingers. Instead, a periodic modulation layer 134 is added on top of the second conductive layer 133.

The periodic modulation layer 134 is formed of periodic structures, and comprises material applied as "stripes" periodically along the length of the sidewall 32, extending essentially from the top (or touch surface 24) of the substrate 20 to the bottom (or second surface 28). Therefore, the stack disposed on the sidewall 32 is formed of the first conductive layer 130, the piezoelectric layer 131, the second conductive layer 133, and the periodic modulation layer 134 to form a transducer 141 for generating or detecting acoustic waves traversing the touch region 24 of a touch sensor 50.

The periodic modulation layer 134 of the transducer 141 serves to spatially modulate the acoustic waves either transmitted or detected by the transducer 141. Where the periodic modulation layer 134 is present, the transmission characteristics of the piezoelectric layer 131 are modulated. Applying an oscillating voltage between the first and second electrodes 130 and 133, respectively, will result in mechanical excitation of the piezoelectric layer 131. Piezoelectric "33" coupling leads to expansion and contraction of the piezoelectric layer 131 perpendicular to the sidewall 32 and hence results in pressure being applied to the vertical surface of the sidewall 32. The two orientations of piezoelectric "31" coupling result in expansion and contraction parallel to the plane of sidewall 32 and result in shear forces in the two orientations being applied to the vertical surface of sidewall 32. One or more of these types of piezoelectric couplings may be useful for generating and receiving a desired acoustic wave mode. For example, in order to coherently couple to acoustic waves to form acoustic paths U1, U2, V1, V2, the piezoelectric transducer must be modulated by adjusting the spacing between maxima and minima of the acoustic waves, as previously discussed in FIG. 18. If no periodic modulation layer 134 is used, coherent generation of acoustic waves only occurs in a direction perpendicular to sidewall 32. However, if a periodic modulation layer 134 is used to coherently couple to diagonally propagating acoustic waves, even the piezoelectric "33" coupling may be used to excite and detect horizontally polarized shear waves (e.g., ZOHPS). Touch sensors 50 and 100 utilizing horizontally polarized shear waves are desired in some applications as the shear waves are not sensitive to water contamination.

The periodic modulation layer 134 can modulate either the amplitude or phase of the coupling between the piezoelectric transducers on the sidewalls 32 and the substrate 20. The periodic modulation layer 134 may comprise resonators, phase shifters or absorbers. Three cases will be considered: (1) the thickness of the piezoelectric layer 131 is much less than $\lambda/2$ (here $\lambda$ is the wavelength of a pressure wave in the piezoelectric layer 131, not substrate 20) as is preferred if the periodic modulation layer 134 is intended to modulate amplitude by resonating; (2) the thickness of the piezoelectric layer 131 is somewhat less than $\lambda/2$ as is preferred if the periodic modulation layer 134 is intended to modulate phase by shifting the resonant frequency; and (3) the piezoelectric layer 131 is approximately equal to $\lambda/2$ as is preferred if the periodic modulation layer 134 is intended to modulate amplitude via damping effects.

Figure 25:
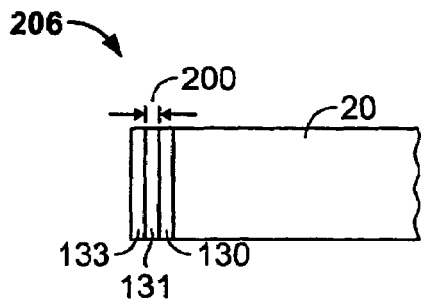
FIGS. 25 and 26 illustrate an example of the first case wherein a piezoelectric mechanism comprises the piezoelectric layer having a thickness that is much less than a half-wavelength in accordance with an embodiment of the present invention.
Figure 26:
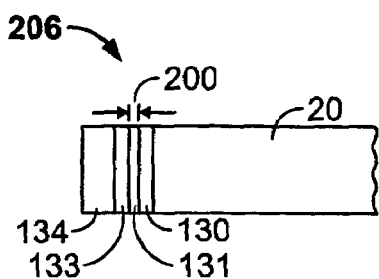

FIGS. 25 and 26 illustrate an example of the first case wherein a piezoelectric mechanism 206 comprises the piezoelectric layer 131 having a thickness 200 that is much less than a half-wavelength in accordance with an embodiment of the present invention. Once the piezoelectric layer 131 is fabricated on (fired on) the substrate 20, it is very rigid compared to the polymer-piezo strips discussed previously. The portion of the piezoelectric mechanism 206 illustrated in FIG. 25 does not have the periodic modulation layer 134 applied, and will have a resonance frequency much higher than the operating frequency of the touch sensor 50. The expansion and contraction of the piezoelectric layer 131 will not be effectively coupled into the substrate 20 for either acoustic wave generation or detection. The portion of the piezoelectric mechanism 206 having the periodic modulation layer 134 present is illustrated in FIG. 26. For better efficiency, the periodic modulation layer 134 can be chosen so that the piezoelectric mechanism 206 with the periodic modulation layer 134 resonates at the operating frequency of the touch sensor 50 (FIG. 3), such as 5 MHz. A material with low acoustic damping, such as glass frits, may be used to form and tune the resonance of the piezoelectric mechanism 206. Alternatively, when the thickness 200 is set of a half-wavelength, the periodic modulation layer 134 may be used to detune the mechanism 206.

Figure 27:
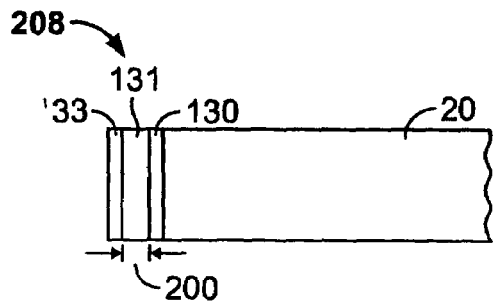
FIGS. 27 and 28 illustrate an example of the second case wherein a piezoelectric mechanism comprises the piezoelectric layer having the thickness that is only somewhat thinner than a half-wavelength and phase-shifting is used to accomplish modulation in accordance with an embodiment of the present invention.
Figure 28:
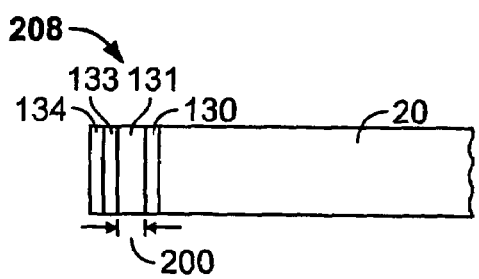

FIGS. 27 and 28 illustrate an example of the second case wherein a piezoelectric mechanism 208 comprises the piezoelectric layer 131 having the thickness 200 that is only somewhat thinner than a half-wavelength and phase-shifting is used to accomplish modulation in accordance with an embodiment of the present invention. The piezoelectric mechanism 208 illustrated in FIG. 27 does not have the modulation layer 134 and is designed to have a resonant frequency slightly higher than the operating frequency of the touch sensor 50. The piezoelectric mechanism 208 in FIG. 28 comprises the modulation layer 134, and can be designed to have a resonant frequency slightly lower than the operating frequency of the touch sensor 50.

Figure 29:
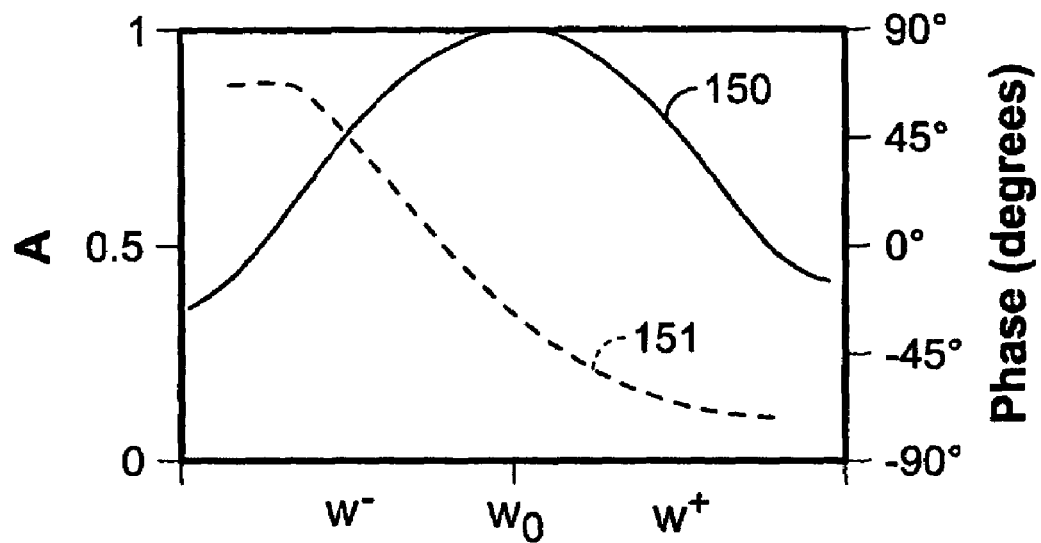
FIG. 29 illustrates the dependence of phase and amplitude for coupling through a resonance at □o in accordance with an embodiment of the present invention.

FIG. 29 illustrates the dependence of phase and amplitude for coupling through a resonance at $\omega_o$ in accordance with an embodiment of the present invention. A solid line 150 represents the normalized resonance amplitude A (axis on left side of graph). A dashed line 151 represents the phase in degrees (axis on right side of graph). From FIG. 29, it is seen that a reasonably large amplitude (greater than about ⅔ of the maximum amplitude) remains when the phase relative to that at resonance is shifted relative to $\omega_o$, for example, by ±45° or ±60°, and hence a total phase modulation of in the range from 90° to 120° can be achieved while still retaining much of the resonant amplitude. A material with low acoustic damping may be used to form the phase-shifting modulation layer 134.

For the third case (not shown in the figures), the modulation layer 134 functions as an absorber. The transducer 141 without the modulation layer 134 is designed to resonate at the operating frequency for strong coupling to the substrate 20. At locations where the absorbing modulation layer 134 is applied, the acoustic resonance is highly damped. Examples of materials that can be used as absorbing modulation layers are metal (e.g., tungsten) loaded epoxies and other ultrasonic wave absorbing materials.

Figure 30:
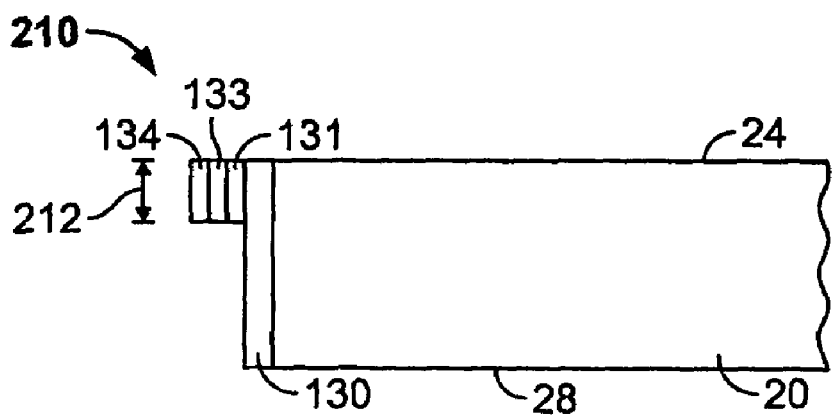
FIG. 30 illustrates a piezoelectric mechanism designed to generate Rayleigh waves in accordance with an embodiment of the present invention.

FIG. 30 illustrates a piezoelectric mechanism 210 designed to generate Rayleigh waves in accordance with an embodiment of the present invention. Edge transducers for Rayleigh waves, such as the mechanism 52 in FIGS. 4 and 8, are more efficient and generate fewer acoustic parasitic signals if the mechanism 52 is limited in depth to match the Rayleigh-wave depth profile, such as the mechanism 52 of FIGS. 13 and 14. Therefore, in FIG. 30 the active region of the piezoelectric layer 131 is limited to depth 212 to match the Rayleigh wave depth profile. This can be done by limiting the piezoelectric layer 131, the second electrode 133, the modulation layer 134, the conductive layer 130, or various combinations thereof, to the depth 212. In some cases, it may be desirable to provide a layer (not shown) on the bottom (or second surface 28) of the substrate 20 that can damp all acoustic modes except Rayleigh waves. An example of such a damping layer is a rigid optical bond comprising an epoxy layer between the substrate 20 and a device (e.g., a display).

Although the periodic modulation layer 134 can be provided on the conductive layer 133 for example by deposition, periodic modulation can also be achieved by other methods. For example, the piezoelectric layer 131 itself can be modulated by annealing selected regions in a periodic fashion to render those regions inactive (e.g., by locally heating the piezoelectric material above a phase transition, for example the Curie point for a ceramic material).

Figure 31:
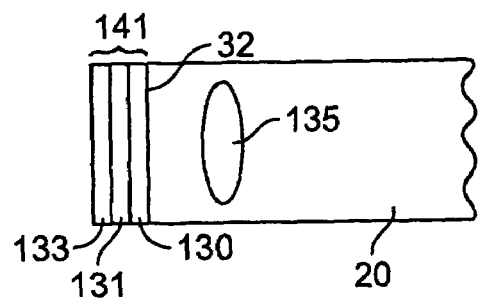
FIG. 31 illustrates an example wherein the substrate can be periodically altered to result in modulation in accordance with an embodiment of the present invention.

FIG. 31 illustrates an example wherein the substrate 20 can be periodically altered to result in modulation in accordance with an embodiment of the present invention. For example, the substrate 20 can be periodically marked 135 using a localized energy source, such as a laser beam, to form periodic structures. If the substrate 20 is glass, a tripled Nd:YAG operating at 355 nm can be used to finely shatter glass in internal regions of the substrate 20. The finely shattered glass can have modified acoustic properties (e.g., increased damping or scattering) and can be used to provide periodic modulation for coherent coupling to acoustic waves. In other words, an optical diffraction grating may be formed having multiple, regularly spaced markings 135 inside the substrate 20. In general, the need for the periodic modulation layer 134 may be eliminated by any other means that modulates the acoustic behavior of the transducer 141 on the sidewalls 32. By way of example only, the piezoelectric layer 131 may be a pressure mode piezo.

Returning to FIG. 24, the transducer 141 may be fabricating in a process in which the sequential layers (first conductive layer 130, piezoelectric layer 131, second conductive layer 133), are "fired-on". That is, the layers 130, 131 and 133 are applied in the form of uncured materials and then thermally cured. The modulation layer 134 can be fired on as well. Silver-loaded ceramics with relatively low sintering temperatures ("silver frit") are well known for fabricating conductive traces on glass substrates and are available in screen printable form. By way of example only, silver frit may be used for the fabrication of conductive layers 130 and 133. For the modulation layer 134 as shown in FIGS. 16B and 17B, any rigid material with low acoustic loss may be used, including the same material used for layers 130 and 133 for manufacturing convenience. Alternatively, the modulation layer 134 can be made of a thermally cured tungsten polymer if modulation layer 134 serves as a damping layer.

For embodiments of structures such as shown in FIG. 24 in which the layers are fired on, a suitable example of a piezoelectric material for layer 131 is a sol-gel based piezoceramic material, such as PZT and $LiTaO_3$ particles dispersed, respectively, in $Al_2O_3$ and PZT sol-gel solutions. Films having thickness of 50-100 µm can result from the firing of such sol-gel solutions. Other piezoceramic materials may be used, such as Sr-doped potassium sodium niobate, or lead-free piezoceramics, such as bismuth-containing piezoceramics. Such piezoelectric material may be applied by any suitable method, including screen printing or spray coating. After being applied in an uncured state, such materials for layer 134 may be cured with the application of heat. Note that the materials of layers 130, 131, 133, and 134 may each be sequentially applied and cured, applied and cured together in the same heating cycle, or combinations in between.

If the piezoelectric layer 131 is a fired-on piezoceramic material, it needs to be poled in order to function as a piezoelectric. Poling can be accomplished by application of a large voltage between the conductive layers 130 and 133, thus generating a high electric field in the material of piezoelectric layer 131. Such poling must be done after any processing steps that will occur at temperatures exceeding the ferroelectric Curie temperature of the piezoelectric material.

If the piezoelectric material 131 is a fired-on piezoceramic material, the substrate material must be chosen to be able to withstand the firing temperature of the fired-on piezoceramic material and any subsequent annealing temperatures. For example, Corning 1737 may be used as its annealing point is 721° C. and its softening point is 975° C., both of which exceed the firing temperature (450° C.) and annealing temperature (650° C.) of the sol-gel formulation described above comprising PZT and $LiTaO_3$ particles dispersed in $Al_2O_3$ and PZT sol-gel solutions, respectively.

The piezoelectric transducer 141 can also be fabricated independently of the substrate 20 and applied as an assembly. The assembly can be, for example, a strip (as previously discussed) that is bonded to the substrate 20 using an adhesive or other suitable bonding technique. The adhesive or bonding layer is preferably thin and sufficiently free of acoustic damping to minimize perturbation to the acoustic operation of the touch sensor 50. A layered assembly comprising first conductive layer 130, piezoelectric layer 131, second conductive layer 133, and optionally, the modulation layer 134, could for example be fabricated on a strip material comprising a glass microsheet, having thickness of 100-200 µm. The layered assembly could then be subdivided (e.g., by dicing) into multiple transducers 141 which could be bonded to multiple substrates 20.

Figure 32:
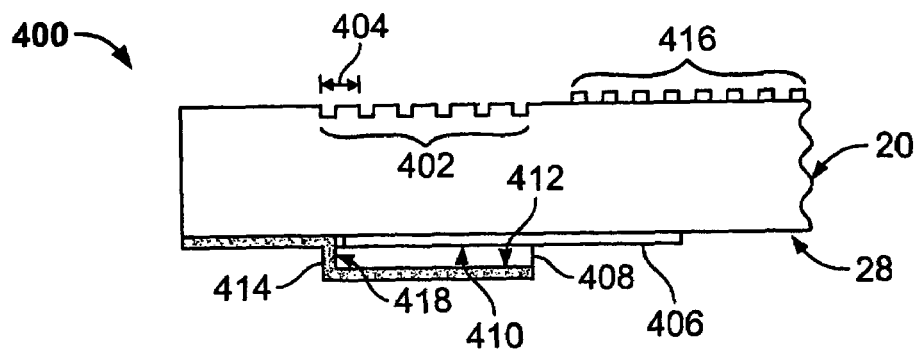
FIG. 32 illustrates a grating transducer being formed on the substrate in accordance with an embodiment of the present invention.

FIG. 32 illustrates a grating transducer 400 being formed on the substrate 20 in accordance with an embodiment of the present invention. A first trace 406 is formed on the second surface 28. The first trace 406 comprises a conductive material such as silver frit. The first trace 406 may be applied using screen printing, pad printing, or other deposition techniques. A first side 410 of a pressure-mode piezoelectric element 408 is applied over and interconnected with a portion of the first trace 406. A second trace 414 is formed on the second surface 28 and is applied over and interconnected with a side surface 418 and a second side 412 of the piezoelectric element 408. As will be discussed further below, electrical connections for exciting the piezoelectric element 408 are interconnected with each of the first and second traces 406 and 414.

Grating elements 402 are formed on the touch surface 24. The grating elements 402 may be formed a distance 404 of a wavelength of the Rayleigh wave apart by deposit or removal of material, such as by screen printing or etching, as previously discussed. A reflective array 416 is also formed on the touch surface 24, and may be formed of added or removed material.

Figure 33:
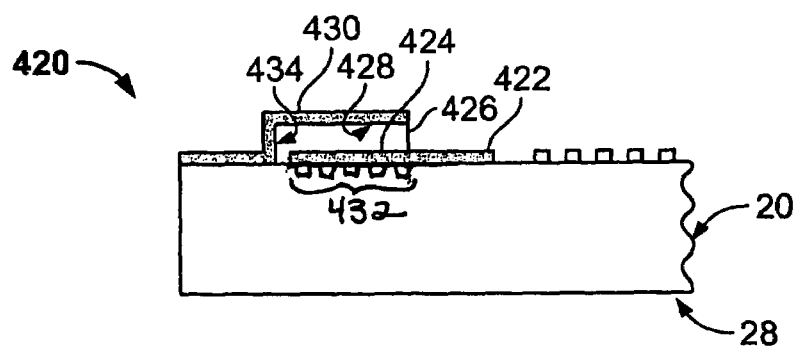
FIG. 33 illustrates a comb transducer being formed on the substrate in accordance with an embodiment of the present invention.

FIG. 33 illustrates a comb transducer 420 being formed on the substrate 20 in accordance with an embodiment of the present invention. As in FIG. 32, grating elements 432 are formed on the touch surface 24. A first trace 422 is formed on the touch surface 24 and over the grating elements 432. A first side 424 of a thickness mode piezoelectric element 426 is applied over and interconnected with a portion of the first trace 422. A second trace 430 is formed on the touch surface 24 and is applied over and interconnected with a side surface 434 and a second side 428 of the piezoelectric element 426.

Figure 34:
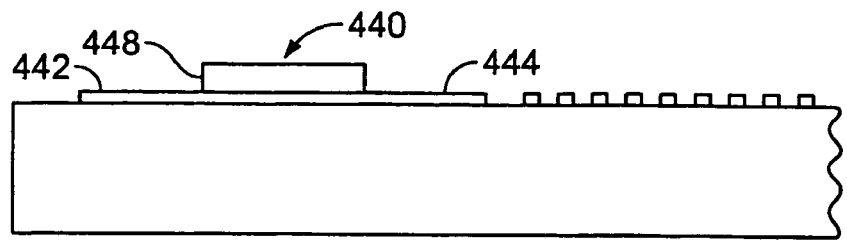
FIG. 34 illustrates an interdigital transducer being formed on the substrate in accordance with an embodiment of the present invention.

FIG. 34 illustrates an interdigital transducer 440 being formed on the substrate 20 in accordance with an embodiment of the present invention. A first trace 442 and a second trace 444 are formed on the touch surface 24 of the substrate 20. The first and second traces 442 and 444 have fingers (not shown) which are interdigital with respect to each other, such as the first and second electrodes 88 and 90 of FIG. 8. A piezoelectric element 448 is applied over and interconnected with the first and second traces 442 and 444.

Figure 35:
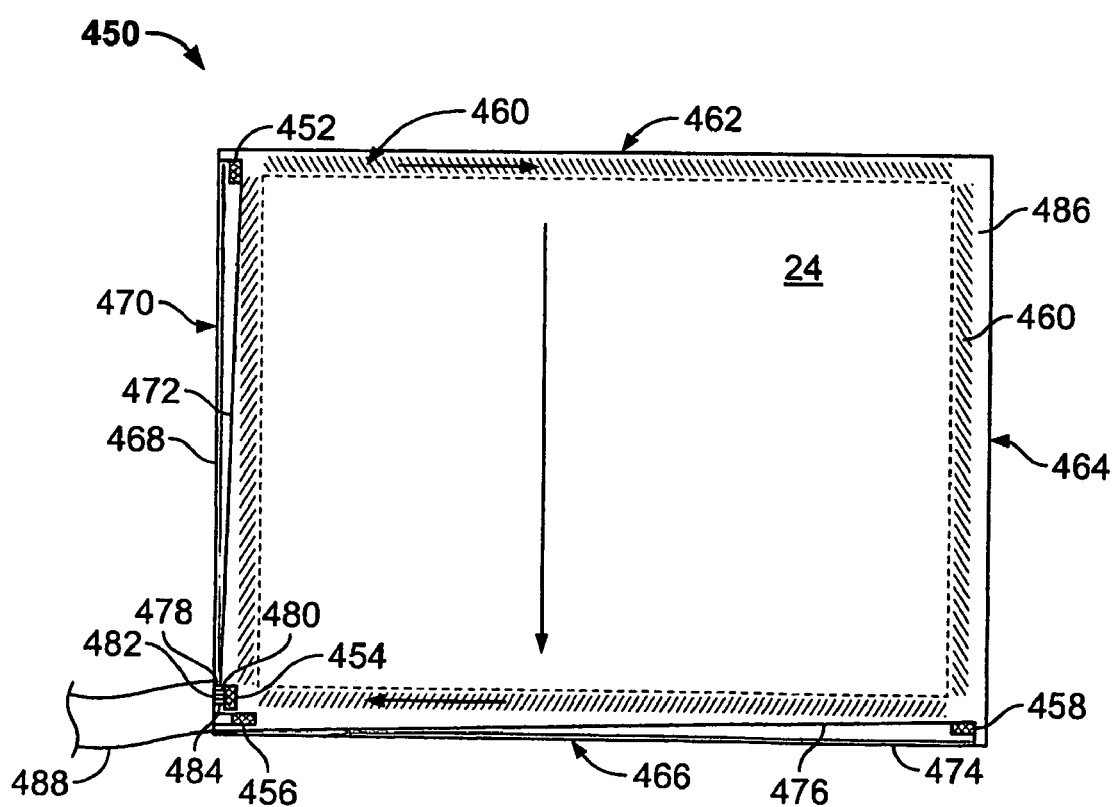
FIG. 35 illustrates a touch sensor having transducers formed along a perimeter of the touch surface in accordance with an embodiment of the present invention.

FIG. 35 illustrates a touch sensor 450 having transducers 452-458 formed along a perimeter 486 of the touch surface 24 in accordance with an embodiment of the present invention. Reflective elements 460 are formed at 45° with respect to edges 462-468 and form reflective arrays within the perimeter 486.

The transducers 452-458 may comprise one of the transducers 400, 420 or 440 of FIGS. 32-34. First and second traces 470-484 are printed on the touch surface 24 proximate the edges 466 and 468, and are interconnected with the appropriate transducer 452-458 as illustrated. The interconnection is determined by the type of transducer being utilized. The first and second traces 470-484 are interconnected with a cable 488 such as by soldering.

Figure 36:
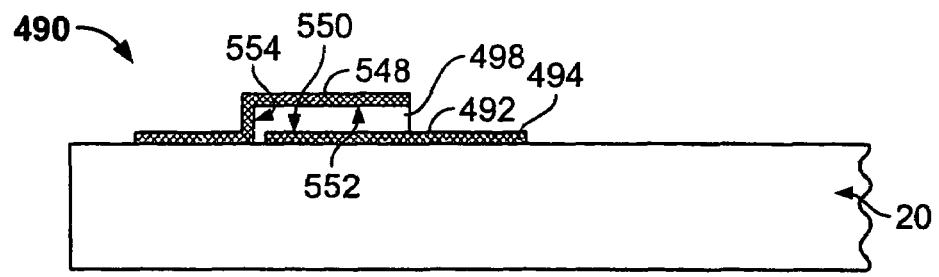
FIG. 36 illustrates an alternative interdigital transducer being formed on the substrate in accordance with an embodiment of the present invention.

FIG. 36 illustrates an alternative transducer 490 being formed on the substrate 20 in accordance with an embodiment of the present invention. First and second traces 492 and 494 are applied on the touch surface 24. A single trace is indicated in the view of FIG. 36. The first and second traces 492 and 494 may for interdigital electrodes as discussed in FIG. 34. A first side 550 of a piezoelectric element 498 is applied over the first and second traces 492 and 494. A ground electrode 548 is applied onto the touch surface 24 and to a second side 552 and a side surface 554 of the piezoelectric element 498.

Figure 37:
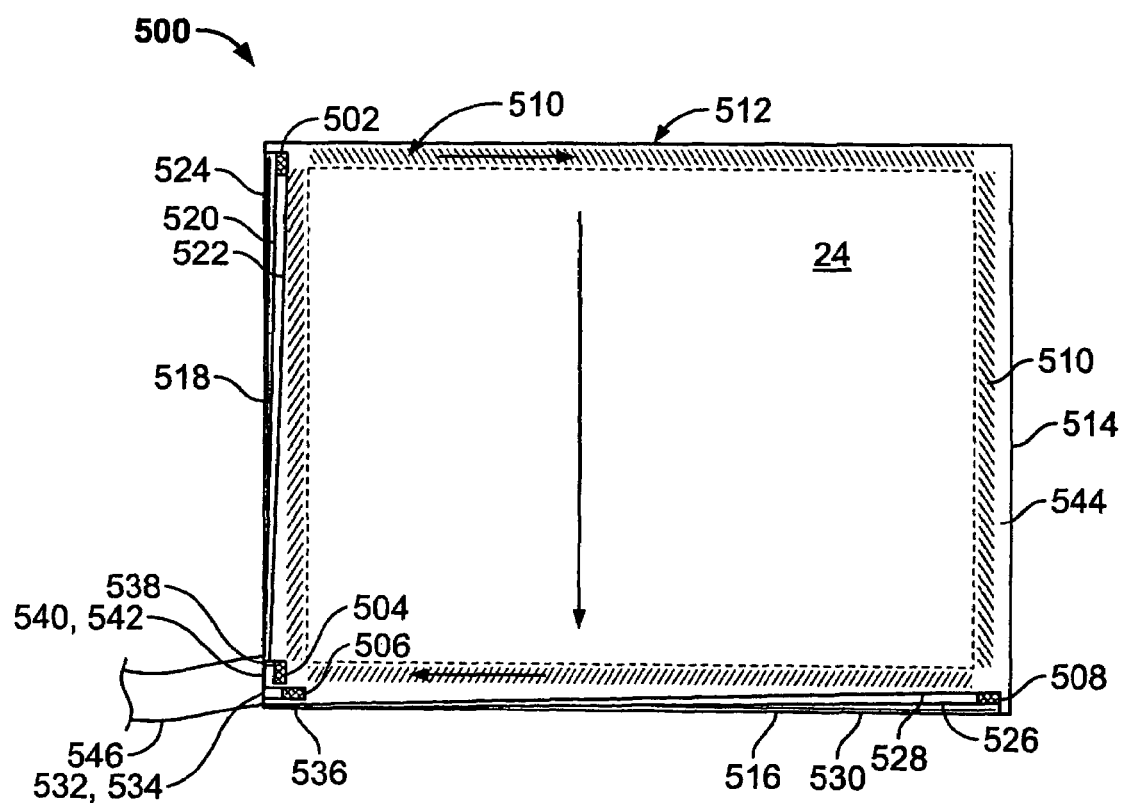
FIG. 37 illustrates a touch sensor having transducers formed along a perimeter of the touch surface in accordance with an embodiment of the present invention.

FIG. 37 illustrates a touch sensor 500 having transducers 502-508 formed along a perimeter 544 of the touch surface 24 in accordance with an embodiment of the present invention. Reflective elements 510 are formed at 45° with respect to edges 512-518 and form reflective arrays within the perimeter 544.

The transducers 502-508 may comprise the transducer 490 of FIG. 36. Ground, first, and second traces 520-542 are printed on the touch surface 24 and interconnected with the appropriate transducer 502-508. The ground, first, and second traces 520-542 may be interconnected with a cable 546 by soldering.

Referring to both FIGS. 35 and 37, a controller (not shown) provides electrical signals to the transducers via the first and second electrodes and a ground via the ground electrode, if necessary. Only one transducer is active at a time. In the configurations illustrated, four transducers are used, and therefore two transducers may operate as transmit transducers and two transducers may operate as receive transducers. It should be understood that other configurations may be formed to receive signals from the touch sensor having two or three transducers which may operate as either transmit or receive, both transmit and receive, or to cover different portions or areas of the touch surface 24.

Figure 38:
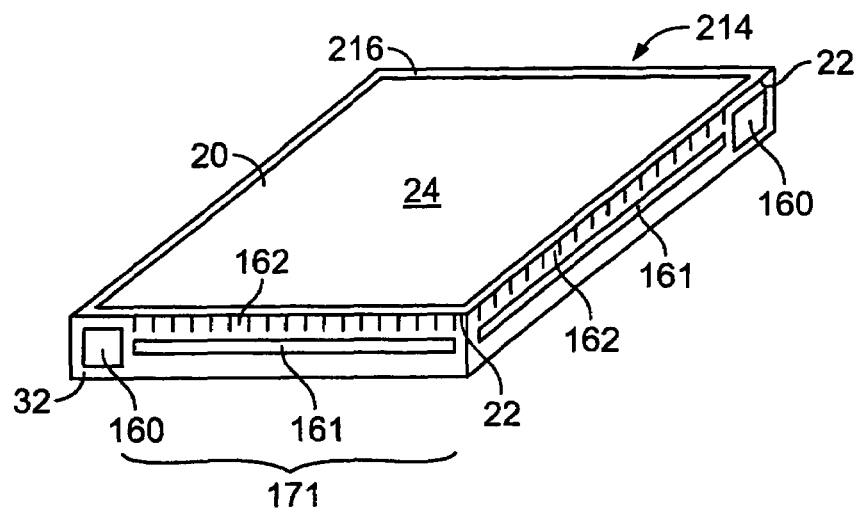
FIG. 38 illustrates an alternative touch sensor formed in accordance with an embodiment of the present invention.

FIG. 38 illustrates an alternative touch sensor 214 formed in accordance with an embodiment of the present invention. The sidewalls 32 and edges 22 are clean, as previously discussed. The substrate 20 has transducers 160, waveguides 161, and reflective arrays 162 disposed on the sidewalls 32. The reflective arrays 162 may be formed proximate the edges 22 or intersecting the edges 22. On each sidewall 32, the transducer 160, waveguide 161 and reflective array 162 may be referred to as a mechanism 171. Optionally, additional waveguides and associated arrays may be formed on the touch surface 24 of the substrate 20. As illustrated in FIG. 38, it is possible to position the waveguides 161 and reflective arrays 162 on the sidewalls 32 to further reduce border area 216 needed by touch sensor mechanisms 171 for generating, directing and detecting acoustic waves. The reflective arrays 162 and waveguides 161 may be formed of grooves in substrate 20 or of protrusions of material deposited on the sidewalls 32 of the substrate 20. The transducer 160 generates an acoustic wave that is coupled into the waveguide 161, thereby focusing the acoustic energy in the core of the waveguide 161. The acoustic energy can then be coupled into the substrate 20 as surface acoustic waves by means of the array 162. The mechanism 171 comprising transducer 160, waveguide 161, and array 162 can operate to generate acoustic waves and direct them across the touch region 24 of the touch sensor 214, or to detect acoustic waves that have traversed the touch region 24 of the touch sensor 214.

As an acoustic wave travels along the length of the waveguide 161, energy will be lost. In many touch sensor 214 applications, it is desired that acoustic energy received by detectors, such as the mechanism 171, not depend strongly on the length of the path traveled. Therefore, various acoustic signal equalization schemes may be incorporated, such as various reflective arrays designed to equalize the signal amplitude as a function of path length. These designs include variations in height or depth of the reflective elements making up reflective arrays, or variations in densities of the reflective elements.

Figure 39:
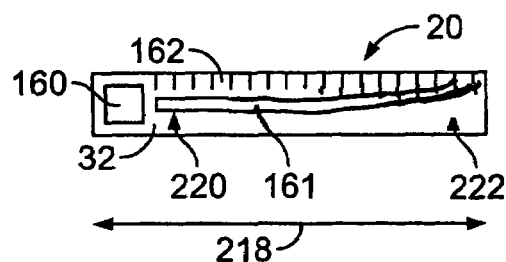
FIG. 39 illustrates a waveguide positioned to accomplish signal equalization in accordance with an embodiment of the present invention.

FIG. 39 illustrates a waveguide 161 positioned to accomplish signal equalization in accordance with an embodiment of the present invention. The transducer 160, waveguide 161, and reflective array 162 are shown to be disposed on the sidewall 32 of the touch sensor substrate 20. The waveguide 161 is formed having a curve along a length 218 of the sidewall 32, such that the waveguide 161 is positioned further from the array 162 at a first end 220 near the transducer 160 when the acoustic energy in the waveguide 161 will be the highest. The waveguide 161 is positioned closer to, intersecting and/or on top of the array 162 at a second end 222 away from the transducer 160 when the acoustic energy in the waveguide 161 will be the lowest. By curving the waveguide 161 in such a manner, signal equalization can be achieved.

Figure 40:
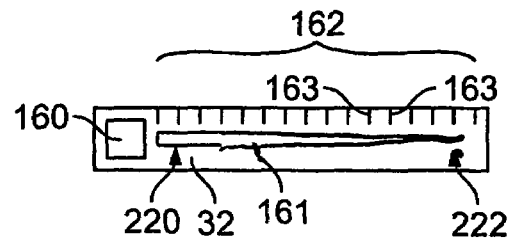
FIG. 40 illustrates the waveguide being formed to accomplish signal equalization in accordance with an embodiment of the present invention.

FIG. 40 illustrates the waveguide 161 being formed to accomplish signal equalization in accordance with an embodiment of the present invention. The core of the waveguide 161 is narrowed, effectively weakening the core, as the distance from the transducer 160 is increased, or as the waveguide 161 moves from the first end 220 to the second end 222. As the core width is reduced, the acoustic wave becomes less confined to the waveguide 161 and spreads out, and the acoustic wave increases its overlap with the reflective array 162. In this case, the spacing between elements 163 of the reflective array 162 may also be varied to account for any effect that the tapered waveguide core has on the wave velocity in the core. It should be understood that the signal equalization provided through the waveguide 161 being formed and/or positioned as illustrated in FIGS. 39 and 40 may be applied equally well to the case in which the waveguide 161 is disposed on the touch surface 24.

Figure 41:
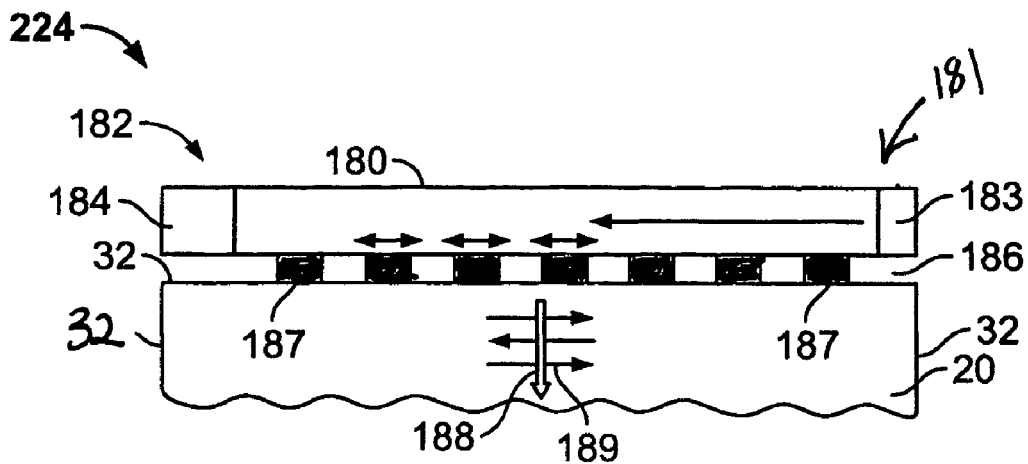
FIG. 41 illustrates another embodiment of a touch sensor in accordance with an embodiment of the present invention.

FIG. 41 illustrates another embodiment of a touch sensor 224 in accordance with an embodiment of the present invention. A substrate 20 having clean sidewalls 32 is provided (see FIG. 2). A strip 180 capable of propagating acoustic waves along its axis is provided. The strip 180 is a waveguide, having a function similar to the waveguide 161 of FIGS. 38-40. The acoustic wave propagating along the strip 180 may be an extensional wave, a flexural wave, or any other type of acoustic wave. The strip 180 is disposed on a sidewall 32 of the glass substrate 20. The strip 180 is bonded to the sidewall 32 with a bonding layer 186 comprising bonding elements 187. On one end 181 of the strip 180 is mounted a pressure mode piezoelectric element 183, and on the opposite end 182 of the strip 180, an energy dump region 184 can optionally be provided. The energy dump region 184 can be applied to one end of the strip 180 to suppress reflections. The energy dump region 184 can comprise any suitable material, for example, tungsten-loaded epoxies, which can be tuned to match the acoustic impedance of the substrate 20. Acoustic waves generated in the strip 180 are coupled to acoustic waves in the substrate 20 which are sensitive to touches on the substrate surface 24.

The strip 180 can comprise any material that can propagate acoustic waves, e.g., metal or glass. Preferably, the coefficient of thermal expansion (CTE) of the strip material is close to that of the substrate 20. In some applications, it may be advantageous for the height (measured along the height of the sidewall 32) of the strip 180 to be approximately equal to the glass substrate thickness. The thickness of the strip 180 (measured perpendicular to its height) is preferably small so that it does not extend a large distance from the substrate 20, thereby keeping the outer edge size of the touch sensor 224 minimized. Examples of strip materials that can be used include a glass rod and a metal strip having CTE close to that of glass (e.g., a nickel alloy such as Invar™ or related materials). Examples of suitable cross-sections of the strip materials are a 3 mm×1 mm rectangle and a ½ mm×½ mm square.

Electrical excitation of the piezoelectric element 183 may result, for example, in a longitudinal wave propagating along the length of the strip 180. Because of boundary conditions imposed by the cross-section of the strip 180, the wave in the strip 180 is not a pure pressure wave, but might be better described as an extensional wave, dialational wave or lowest-order symmetric Lamb wave. As a wave with a longitudinal component propagates, material in the strip 180 has a component of motion parallel to the direction of the wave propagation (i.e., along the length of the strip 180).

The bonding layer 186 provides a mechanical bond and the spacing of the periodically spaced bonding elements 187 determines the scattering angle from the wave generated in the strip 180 to the acoustic wave launched into the substrate 20. The bonding elements 187 are formed as periodic structures similar to a reflective array. For example if the touch sensor 224 is rectangular, and it is desired to scatter at 90° to the sidewall 32, then the spacing of the bonding elements 187 should be equal to the wavelength of the acoustic wave in the strip 180. Scattering at 90° is indicated in FIG. 41 by the arrow 188. As one example of a coupling mechanism, bonding elements 187 may transfer shear forces thus coupling longitudinal motion of the wave in the strip 180 to transverse motion of a shear wave in the substrate 20 as is indicated by the arrows 189 in FIG. 41. The compressive stiffness of bonding elements 187 can also couple transverse motion of a strip wave to the longitudinal component of motion of a touch sensing wave (e.g. Rayleigh wave) in substrate 20 (this coupling mode is not shown in the figure). The strip 180 can also function to receive acoustic waves from the substrate 20.

Figure 42:
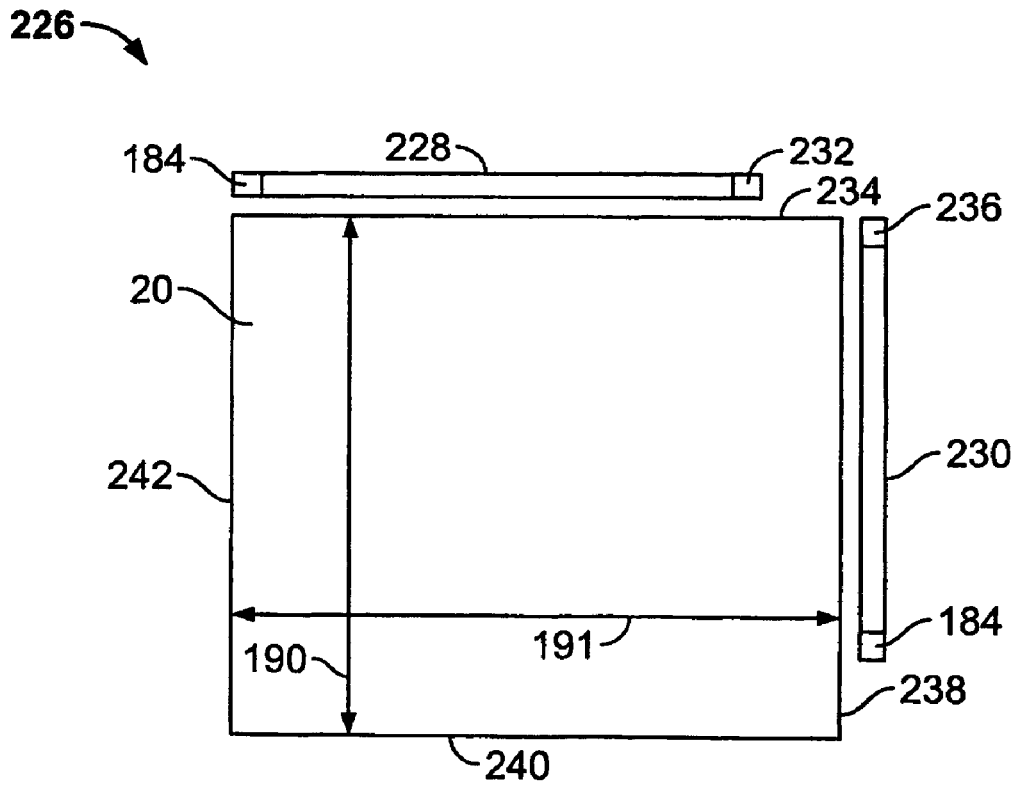
FIG. 42 illustrates a touch sensor incorporating the strips in accordance with an embodiment of the present invention.

FIG. 42 illustrates a touch sensor 226 incorporating the strips 180 in accordance with an embodiment of the present invention. The strips 180 are indicated as strips 228 and 230 for clarity. A first strip 228 having piezoelectric element 232 is disposed along a first sidewall 234 of the substrate 20, and a second strip 230 having piezoelectric element 236 is disposed along a second adjacent sidewall 238 of the substrate 20. As indicated by arrow 190, the shear waves generated by piezoelectric element 232 and directed into substrate 20 by the strip 228 can reflect off sidewall 240 and be directed by strip 228 to be detected by piezoelectric element 232. As indicated by arrow 191, shear waves generated by piezoelectric element 236 and directed by strip 230 into substrate 20 can reflect off sidewall 242 and be directed by strip 230 to be detected by element 236. Electronics (not shown) connected to piezoelectric elements 232 and 236 can be used to time-multiplex signals in order to coordinate between transmitting and receiving modes.

Alternately, a touch sensor may include strips mounted on all sidewalls 32 (not shown). For example, for a rectangular substrate 20, four strips 180 can used, wherein two of the strips 180 operate in transmission mode and two of the strips 180 operate in receiving mode.

If strips 180 mounted to the sidewalls 32 of the substrate 20 are designed to excite Rayleigh waves in the substrate 20, the bonding elements 187 should be bonded on the sidewall 32 within about one Rayleigh wavelength of the touch surface 20 in order to effectively couple to Rayleigh waves as shown in FIGS. 22 and 23. The depth dimension of strip 180 may or may not match the depth dimension of the bonding elements 187.

The strength of coupling between the strip 180 and substrate 20 can be affected by one or more of the stiffness, thickness or bonding area of the bonding elements 187. Preferably the amplitude of the acoustic wave coupled into the substrate 20 is independent of the point along a sidewall 32 at which it is coupled in. Any parameter affecting the coupling between the strip 180 and the substrate 20 can be used to equalize acoustic signal amplitude as a function of distance along a length of the substrate 20.

FIG. 41 illustrates the case where bonding layer 186 alternates between the presence of bonding material (bonding elements 187) and the absence of bonding material. This provides a spatial modulation of the coupling strength between the strip 180 and substrate 20. Alternate means exist to provide the desired spatial modulation of coupling, for example a bonding layer with no air gaps, but for which the mechanical properties (such as stiffness) of the bonding material are modulated. It should be understood that the strip 181 and bonding elements 187 may be formed separate from the substrate 20 and then attached as an assembly.

Figure 43:
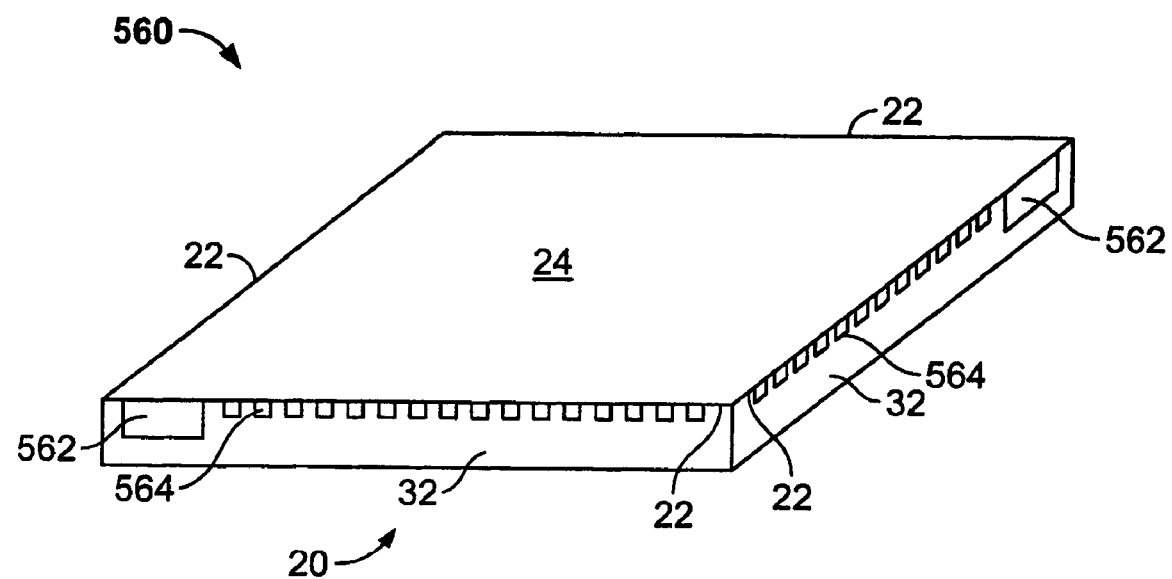
FIG. 43 illustrates a touch sensor having transducers formed on the sidewalls of the substrate in accordance with an embodiment of the present invention.

FIG. 43 illustrates a touch sensor 560 having transducers 562 formed on the sidewalls 32 of the substrate 20 in accordance with an embodiment of the present invention. When excited, the transducers 562 generate an edge wave which propagates along the edge 22 and is reflected across the touch surface 24 by the reflective array 564. Such touch sensors are described in U.S. Provisional Patent Application Ser. No. 60/562,461, which is incorporated herein by reference. The transducers 562 may include piezoelectric material printed on the sidewalls 32 using the screen printing and other techniques described previously. Alternatively, the transducers 562 may include piezoelectric material formed separately and bonded to the sidewalls 32.

For any of the embodiments for touch sensors described herein, the touch sensor may be connected to a controller by means of an electrical interconnect. Any suitable interconnect may be used, for example, a cable harness. Alternatively, the touch sensor may be integrated directly into a touch sensor system, for example, the touch sensor may be integrated with a display to make a touchscreen. Optionally, screen printing may be accomplished on the surface of a substrate used in a vacuum fluorescent display, such as an instrument panel. By way of example, the substrate may form an external layer of a display device, such as a vacuum fluorescent display.

It will be understood that the above-described arrangements of apparatus are merely illustrative of applications of the principles of this invention and many other embodiments and modifications may be made without departing from the spirit and scope of the claims.

What is claimed is:

1. A touch sensor comprising:
    a substrate capable of propagating acoustic waves, the substrate including a first surface having a touch sensitive region and including a first sidewall intersecting the first surface at a first edge; and
    a transmitter, provided on the first sidewall of the substrate, for generating acoustic waves that propagate directly from the first sidewall through at least a portion of the touch sensitive region, said acoustic wave (i) comprising a shear wave and (ii) forming an acute angle with the first sidewall, and said transmitter comprising (i) a piezoelectric transducer comprising a first conductive layer provided on the first sidewall, a piezoelectric material applied over the first conductive layer, and a second conductive layer provided as a continuous covering over the piezoelectric material, the piezoelectric material having been thermally cured after application to the first conductive layer, and (ii) a periodic modulation layer.

2. The touch sensor of claim 1, wherein the first surface and the first sidewall intersect at the first edge with an angle of approximately 90°.

3. The touch sensor of claim 1, further comprising a detector provided on a second sidewall of the substrate, the detector detecting the acoustic waves after traversing at least a portion of the touch sensitive region.

4. The touch sensor of claim 1, wherein the transmitter further comprises a second transducer, the first and second transducers provided on opposed first and third sidewalls of the substrate, respectively, the first and second transducers generating first and second acoustic waves that propagate along directions oriented at acute angles to the opposed first and third sidewalls.

5. The touch sensor of claim 1, wherein the modulation layer is formed to modulate the acoustic waves in one of damping the acoustic waves, tuning and detuning the acoustic wave with respect to a resonant frequency, and shifting a phase of the acoustic wave.

6. The touch sensor of claim 1 wherein the shear wave comprises a zeroth order horizontally polarized shear wave.

7. The touch sensor of claim 1 wherein the first conductive layer, the piezoelectric material, and the second conductive layer are thermally cured together.

8. A method for detecting a touch on a touch sensitive region of a substrate capable of propagating acoustic waves, the substrate including a first surface having the touch sensitive region, the substrate having first and second sidewalls intersecting the first surface, the method comprising:
    generating an acoustic wave proximate the first sidewall of the substrate by means of a transmitter, said acoustic wave (i) comprising a shear wave and (ii) forming an acute angle with the first sidewall, and said transmitter comprising (i) a piezoelectric transducer comprising a first conductive layer provided on the first sidewall, a piezoelectric material applied over the first conductive layer, and a second conductive layer provided as a continuous covering over the piezoelectric material, the piezoelectric material having been thermally cured after application to the first conductive layer, and (ii) a periodic modulation layer;
    directing the acoustic wave through a portion of the first sidewall of the substrate into the substrate and across at least a portion of the touch sensitive region; and
    detecting the acoustic wave proximate the second sidewall of the substrate.

9. The method of claim 8, wherein the detecting further comprises detecting perturbations in the acoustic wave, the perturbations being indicative of a location of a touch event.

10. The method of claim 8, wherein the directing further comprises directing the acoustic wave along a linear direction extending directly from a source located along a length of the first sidewall through at least a portion of the touch sensitive region, wherein the acoustic wave completes a signal path without being reflected.

* * * * *